(12) United States Patent
Kuriyama

(10) Patent No.: US 7,511,944 B2
(45) Date of Patent: Mar. 31, 2009

(54) SOLID ELECTROLYTIC CAPACITOR AND METHOD FOR MANUFACTURING SAME

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 275 days.

(21) Appl. No.: 10/576,334

(22) PCT Filed: Oct. 20, 2004

(86) PCT No.: PCT/JP2004/015498

§ 371 (c)(1),
(2), (4) Date: Apr. 18, 2006

(87) PCT Pub. No.: WO2005/038832

PCT Pub. Date: Apr. 28, 2005

(65) Prior Publication Data

US 2007/0127191 A1    Jun. 7, 2007

(30) Foreign Application Priority Data

Oct. 20, 2003   (JP) .............................. 2003-359049

(51) Int. Cl.
*H01G 2/10* (2006.01)
*H01G 9/08* (2006.01)

(52) U.S. Cl. ................... 361/535; 361/528; 29/25.03

(58) Field of Classification Search ................ 361/523, 361/528–529, 532, 535–540; 29/25.03
See application file for complete search history.

(56) References Cited

U.S. PATENT DOCUMENTS 4,330,929 A * 5/1982 Cripe .................... 29/25.03
5,198,968 A * 3/1993 Galvagni ................ 361/529

FOREIGN PATENT DOCUMENTS

| JP | 56-112716 | 9/1981 |
|----|-----------|--------|
| JP | 6-120707 | 4/1994 |
| JP | 61-83025 | 6/1996 |
| JP | 2001-185460 | 7/2001 |
| JP | 2002-353073 | 12/2002 |
| JP | 2003-163137 | 6/2003 |
| JP | 2003-243263 | 8/2003 |

* cited by examiner

*Primary Examiner*—Eric Thomas
(74) *Attorney, Agent, or Firm*—Hamre, Schumann, Mueller & Larson, P.C.

(57) ABSTRACT

A solid electrolytic capacitor (A1) includes a porous sintered body (1) of valve metal, and a metal case (2) accommodating the porous sintered body. The metal case (2) and the porous sintered body (1) are electrically connected to each other to serve as an anode. The porous sintered body (1) is formed with a dielectric layer and a solid electrolyte layer. The solid electrolyte layer serves as a cathode.

25 Claims, 19 Drawing Sheets

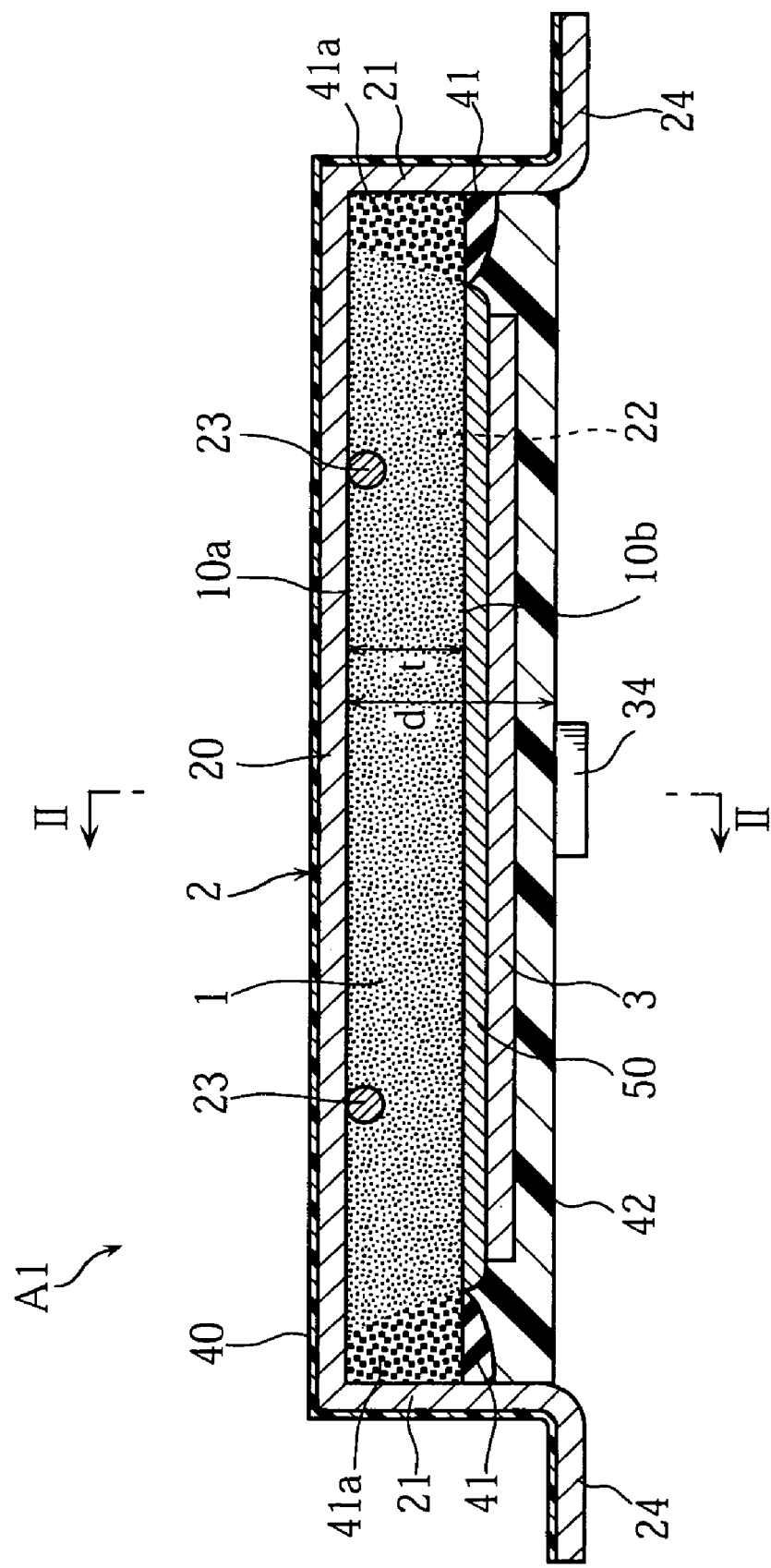

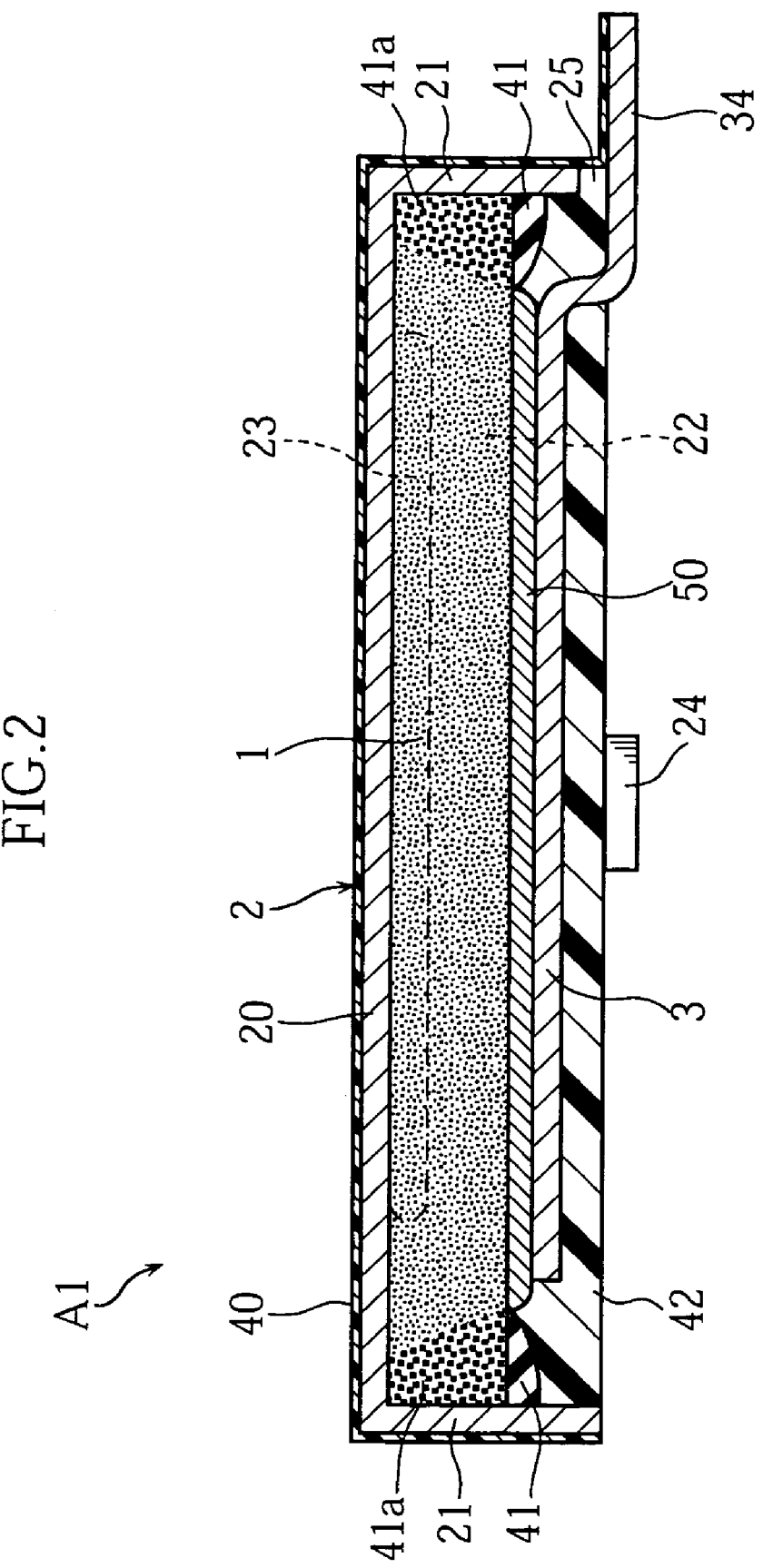

SOLID ELECTROLYTIC CAPACITOR AND METHOD FOR MANUFACTURING SAME

TECHNICAL FIELD

The present invention relates to a solid electrolytic capacitor and a method of manufacturing the same.

BACKGROUND ART

An example of solid electrolytic capacitor is disclosed in Patent Document 1 described below. The prior art solid electrolytic capacitor includes a porous sintered body made of so-called "valve metal". The sintered body is sealed in a resin package after a dielectric layer and a solid electrolyte layer are formed thereon.

Patent Document 1: JP-A 2003-163137

For instance, the solid electrolytic capacitor having the above-described structure is used as a bypass capacitor connected between an electronic device (such as a CPU) and a power supply circuit. In accordance with the recent speed increase and digitalization of electronic devices, a power supply system which operates stably and responds at high speed is demanded. Accordingly, also with respect to a solid electrolytic capacitor used for noise cancellation and the stabilization of a power supply system, excellent noise cancellation performance and high responsiveness in supplying power are demanded. Further, a large capacitance and high reliability for preventing firing are also demanded.

The capacitance of a solid electrolytic capacitor can be increased by increasing the surface area or volume of the porous sintered body. However, to merely increase the capacitance causes the degradation of frequency characteristics. Specifically, the frequency characteristics of a capacitor are generally determined by two factors of $1/\omega CR$ and $\omega L$. Herein, $\omega=2\Pi f$ (f represents frequency), C represents capacitance, R represents resistance and L represents inductance. Of the two factors, the frequency characteristics of most solid electrolytic capacitors are substantially determined by $1/\omega CR$. Therefore, in doubling the capacitance, R need be cut in half to avoid the degradation of the frequency characteristics. Further, when the size of the porous sintered body is merely increased, the ESR (internal resistance, equivalent series resistance) increases. Therefore, in increasing the capacitance, the increase of ESR and the degradation of the frequency characteristics need be prevented. Particularly, when the thickness of the porous sintered body is increased to increase the size of the porous sintered body, the resistance in the electrical path from the obverse surface to the interior increases, which degrades the frequency characteristics. Further, the treatment liquid for forming a dielectric layer or a solid electrolyte layer in the porous sintered body becomes unlikely to permeate into the entire interior of the porous sintered body, so that the productivity of the solid electrolytic capacitor is degraded. Moreover, since a porous sintered body is made by sintering powder of niobium or tantalum, the reliability for preventing firing may be deteriorated by increasing the size of the porous sintered body.

Conventionally, therefore, to solve the above-described problems, the capacitance is increased by connecting a large number of small capacitors in parallel. However, such use of a large number of capacitors requires a large space for mounting the capacitors and also increases the manufacturing cost.

As means for increasing the capacitance without causing such disadvantages, to reduce the thickness of the porous sintered body maybe considered. When the thickness of a porous sintered body is reduced, the distance between electrodes is reduced. As a result, the impedance in the capacitor is reduced, which achieves low ESR. However, when the thickness of a porous sintered body is reduced, the length and the width are increased. Therefore, the possibility that the porous body warps in the sintering process or cracks increases. Moreover, even when the thickness of the porous sintered body is reduced, the heat generation in use is increased, because the entire volume is increased. Therefore, the performance of the capacitor itself may be reduced or the reliability for preventing firing may be degraded.

DISCLOSURE OF THE INVENTION

The present invention is conceived under the above-described circumstances. It is, therefore, an object of the present invention to provide a solid electrolytic capacitor whose capacitance is increased without degrading the frequency characteristics and which is unlikely to warp or crack. Another object of the present invention is to provide a method for manufacturing such a solid electrolytic capacitor.

To solve the above-described problems, the present invention takes the following technical measures.

According to a first aspect of the present invention, there is provided a solid electrolytic capacitor comprising a porous sintered body of valve metal, and a metal case accommodating the porous sintered body.

With such a structure, the porous sintered body is protected by the metal case and does not easily warp or crack even when the porous sintered body has a relatively small thickness. Since the metal case also serves to dissipate heat generated in the porous sintered body to the outside, the temperature rise at the porous sintered body in use is suppressed. Therefore, the solid electrolytic capacitor according to the present invention has a large capacitance and excellent frequency characteristics as a result of increasing the size of the porous sintered body while reducing the thickness thereof and is reliably prevented from firing.

Preferably, the solid electrolytic capacitor according to the present invention further comprises a dielectric layer and a solid electrolyte layer which are formed at the porous sintered body. The solid electrolyte layer acts as a cathode. The metal case is made of valve metal, and the metal case and the porous sintered body are electrically connected to each other to act as an anode.

With such an arrangement, the metal case also acts as an anode similar to the porous sintered body, which is advantageous for increasing the entire capacitance.

Preferably, the metal case includes a main plate portion, and a side plate portion standing from the periphery of the main plate portion. The main plate portion and the side plate portion define a hollow for accommodating the porous sintered body. With such a structure, the main plate portion and the side plate portion of the metal case surround the porous sintered body, whereby the porous sintered body is reliably protected.

Preferably, the porous sintered body is flat and has a thickness which is smaller than the depth of the hollow of the metal case. With such a structure, the porous sintered body does not project out from the metal case in the thickness direction, so that the porous sintered body is reliably protected. Further, a space is left in the metal case which can be utilized for loading sealing resin or storing the treatment liquid poured into the metal case to form a dielectric layer or a solid electrolyte layer so that the treatment liquid gradually permeates into the porous sintered body, which will be described later.

Preferably, the porous sintered body includes a first surface, and a second surface opposite to the first surface, and the first surface is bonded to the main plate portion of the metal case directly. Alternatively, the first surface of the porous sintered body is bonded to the main plate portion of the metal case via a bonding material containing valve metal powder. With such an arrangement, the porous sintered body is reliably fixed and held in the metal case, and the electrical connection between the metal case and the porous sintered body to make them act as an anode is reliably achieved.

Preferably, the metal case is provided with at least one anode terminal extending outward from the metal case. With such a structure, the soldering of the anode terminal to an intended mount region can be properly performed. Since the anode terminal is provided by utilizing the metal case, the entire structure is simplified.

Preferably, the metal case is provided with a plurality of anode terminals extending outward from the metal case so that a current can flow through the metal case via the anode terminals. With such a structure, the circuit current flows through the metal case and the porous sintered body, and the equivalent series inductance thereof blocks high-frequency noises. Therefore, the noise cancellation performance for a high frequency band is enhanced. When the capacitor is used for power supply, the equivalent series inductance becomes lower than that in a conventional structure, so that high response speed in power supply can be achieved.

Preferably, the anode terminal is integrally formed on the side plate portion of the metal case. With such a structure, the anode terminal is provided without increasing the number of parts, which is preferable for suppressing the manufacturing cost.

Preferably, the solid electrolytic capacitor further comprises a metal member made of the same material as the metal case and bonded to the metal case. Part of the metal member serves as the anode terminal. With such a structure, the metal case is reinforced by the metal member, and the metal member can also act as an anode.

Preferably, part of the solid electrolyte layer is provided on the second surface of the porous sintered body. The solid electrolytic capacitor further comprises a metallic connecting member made of metal and bonded to the part of the solid electrolyte layer. Part of the metallic connecting member serves as a cathode terminal. With such a structure, the provision of the cathode terminal can be achieved by a simple structure.

Preferably, the metal case is formed with a cutout, and part of the metallic connecting member extends from the inside to the outside of the metal case by passing through the cutout. With such an arrangement, the cathode terminal can be properly arranged outside the metal case while preventing undesirable electrical connection between the metal member and the metal case.

Preferably, the second surface of the porous sintered body includes a periphery formed with an insulating layer, and the part of the solid electrolyte layer on the second surface is formed at a region surrounded by the insulating layer. With such an arrangement, undesirable electrical connection between the solid electrolyte layer and the metal case can be properly prevented by a simple structure.

Preferably, the insulating layer is made of resin, and part of the resin is impregnated into a peripheral portion of the porous sintered body. With such an arrangement, the part of the solid electrolyte layer which is formed in the porous sintered body is easily and properly prevented from being connected to the metal case. At the periphery of the porous sintered body, particularly at the corners, the degree of sintering may be lower than at other portions. The resin insulates such portions with lower degree of sintering and reinforces such portions so as not to be easily damaged.

Preferably, the metal case includes an irregular inner surface, and the inner surface is bonded to the porous sintered body. In such a case, to the inner surface of the metal case, a metal member made of valve metal may be welded to form a projection. Alternatively or additionally to the above, a plurality of recesses and a plurality of burrs corresponding to the recesses may be formed at the inner surface of the metal case. The inner surface of the metal case may be provided with a plurality of projections formed by partially bulging the metal case. With such arrangements, the bonding strength between the porous sintered body and the metal case is increased.

Preferably, the metal case includes an opening which is closed with resin. With such an arrangement, the interior of the metal case is properly protected by the resin.

Preferably, the metal case includes an outer surface which is at least partially covered with resin. With such an arrangement, the protection and electrical insulation of the metal case is achieved properly.

Preferably, the solid electrolytic capacitor according to the present invention further comprises a dielectric layer and a solid electrolyte layer formed at the porous sintered body, an anode wire partially extending into the porous sintered body, a metal member electrically connected to the anode wire and including a portion serving as an anode terminal, and a cathode terminal electrically connected to the solid electrolyte layer. In this case, the metal case is electrically connected to the solid electrolyte layer, and the cathode terminal is provided at the metal case.

According to a second aspect of the present invention, there is provided a method for manufacturing a solid electrolytic capacitor. The solid electrolytic capacitor includes a metal case and a porous sintered body accommodated in the metal case. The manufacturing method comprises a first step of preparing the metal case, and a second step of preparing the porous sintered body.

Preferably, the second step includes compacting valve metal powder put in the metal case to provide a porous body, and heating the porous body together with the metal case to provide a porous sintered body.

Preferably, the second step includes bonding a porous body of valve metal powder into the metal case by using a bonding material containing valve metal powder, and heating the porous body with the metal case to provide a porous sintered body.

Preferably, the second step includes bonding a porous sintered body of valve metal powder into the metal case by using a bonding material containing valve metal powder.

Preferably, the first step includes subjecting a metal frame to drawing.

Preferably, the manufacturing method of the present invention further comprises the step of forming a dielectric layer and a solid electrolyte layer at the porous sintered body. The porous sintered body includes a bonding surface bonded to the metal case and a non-bonding surface which is not bonded to the metal case. The step of forming the dielectric layer and the solid electrolyte layer comprises forming the dielectric layer and the solid electrolyte layer at an interior and the non-bonding surface of the porous sintered body.

Preferably, the metal case includes an opening defined by a plurality of side plate portions, and the step of forming the dielectric layer and the solid electrolyte layer is performed by setting the metal case to be open upward and pouring treatment liquid for forming the dielectric layer or the solid electrolyte layer into the metal case through the opening.

Preferably, the manufacturing method of the present invention further comprises the step of forming an insulating layer at the periphery of the non-bonding surface of the porous sintered body before forming the solid electrolyte layer. The insulating layer prevents the solid electrolyte layer from being formed at the periphery of the non-bonding surface.

Preferably, the manufacturing method further comprises the step of providing, after the formation of the dielectric layer and the solid electrolyte layer, a metal member at the non-bonding surface of the porous sintered body so that the metal member is electrically connected to the solid electrolyte layer. Part of the metal member is extended out of the metal case to act as a cathode terminal.

Preferably, the manufacturing method of the present invention further comprises the step of loading resin into the metal case to seal part of the metal member with the resin after the metal member is provided at the non-bonding surface.

Preferably, the manufacturing method of the present invention further comprises the step of covering an outer surface of the metal case with resin.

BRIEF DESCRIPTION OF THE DRAWINGS

FIG. 1 is a sectional view showing the basic structure of a solid electrolytic capacitor according to a first embodiment of the present invention.

FIG. 2 is a sectional view taken along lines II-II in FIG. 1.

FIG. 3A is a perspective view showing a metal case and an auxiliary metal plate of the solid electrolytic capacitor of FIG. 1, whereas

FIG. 5A is a perspective view showing a metal frame used for manufacturing the solid electrolytic capacitor shown in FIG. 1, whereas

FIG. 6A is a sectional view showing a metal case in which valve metal powder is put in, whereas

FIG. 22A is a sectional view showing another example of process step for molding a porous sintered body, whereas

BEST MODE FOR CARRYING OUT THE INVENTION

Figure 3A:
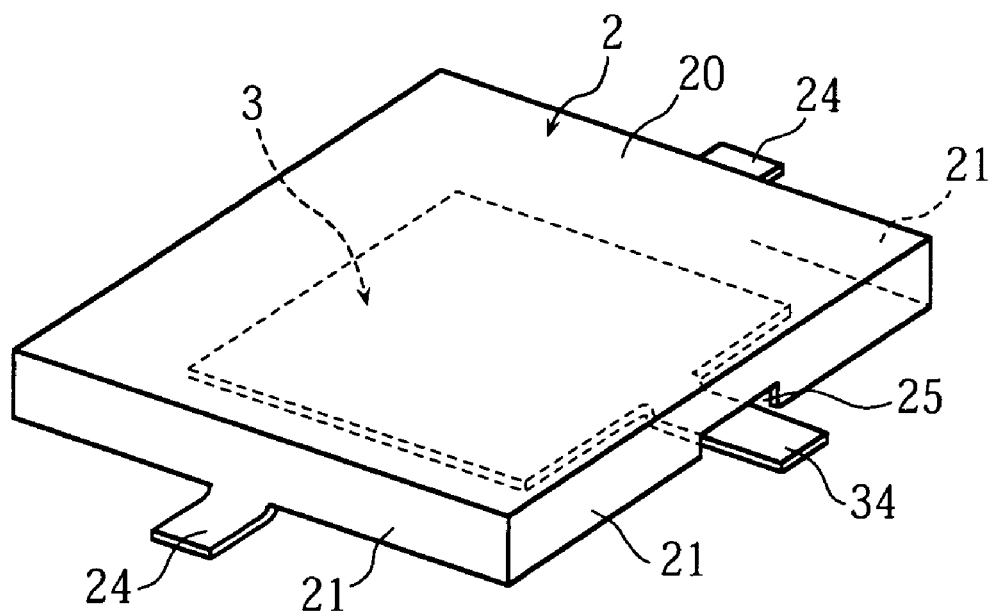

Preferred embodiments of the present invention will be described below with reference to the accompanying drawings.

FIGS. 1 and 2 show a solid electrolytic capacitor (indicated by reference sign A1) according to a first embodiment of the present invention. The solid electrolytic capacitor A1 includes a porous sintered body 1, a metal case 2 and an auxiliary metal plate 3.

The porous sintered body 1 is formed by compacting powder of so-called "valve metal" such as niobium or tantalum and the subsequent compacting, and is in the form of a flat rectangular plate. A dielectric layer and a solid electrolyte layer, which will be described later, are formed in the porous sintered body 1 and at a lower surface 10b of the porous sintered body 1.

The metal case 2 is formed by pressing a metal plate of niobium, for example. The case 2 comprises a main plate portion 20 in the form of a rectangular flat plate, and four side plate portions 21 extending downward from the periphery of the main plate portion 20. The main plate portion 20 and the four side plate portions 21 define a hollow 22 which opens downward. The porous sintered body 1 is accommodated in the hollow 22. The porous sintered body 1 has a thickness t which is smaller than the depth d of the hollow 22. Thus, a space is provided under the porous sintered body 1 in the metal case 2 for arranging the auxiliary plate 3, and a conductive layer 50 and resin 42, which will be described later. The porous sintered body 1 has an upper surface 10a which is in direct contact with a lower surface of the main plate portion 20 of the metal case 2. The porous sintered body 1 and the metal case 2 serve as an anode. A plurality of wires 23 made of niobium is welded to the lower surface of the main plate portion 20. The wires 23 are embedded in the porous sintered body 1, whereby the bonding strength between the porous sintered body 1 and the metal case 2 is enhanced.

Figure 3B:
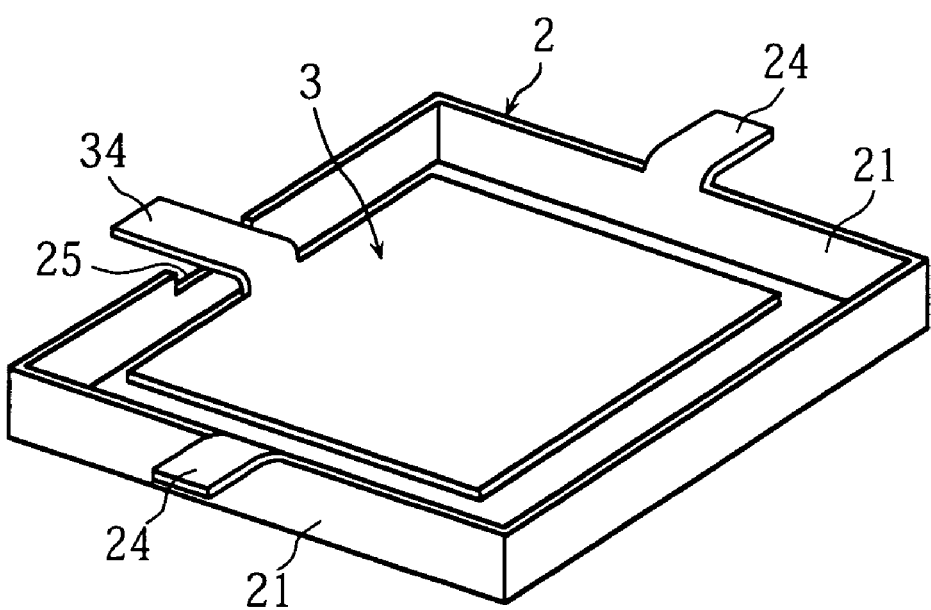
FIG. 3B is a perspective view showing the state in which the metal case and the auxiliary metal plate are turned over.

An insulating resin layer 40 is formed on the outer surface of the metal case 2. The resin layer 40 is made of thermosetting resin such as epoxy resins, for example. As shown in FIG. 3B, two of the side plate portions 21 of the metal case 2 are integrally formed with anode terminals 24, respectively. Each of the anode terminals 24 extends from the lower edge of the side plate portion 21 to project out from the metal case 2 to be suitable for the surface mounting of the solid electrolytic capacitor A1.

Figure 4:
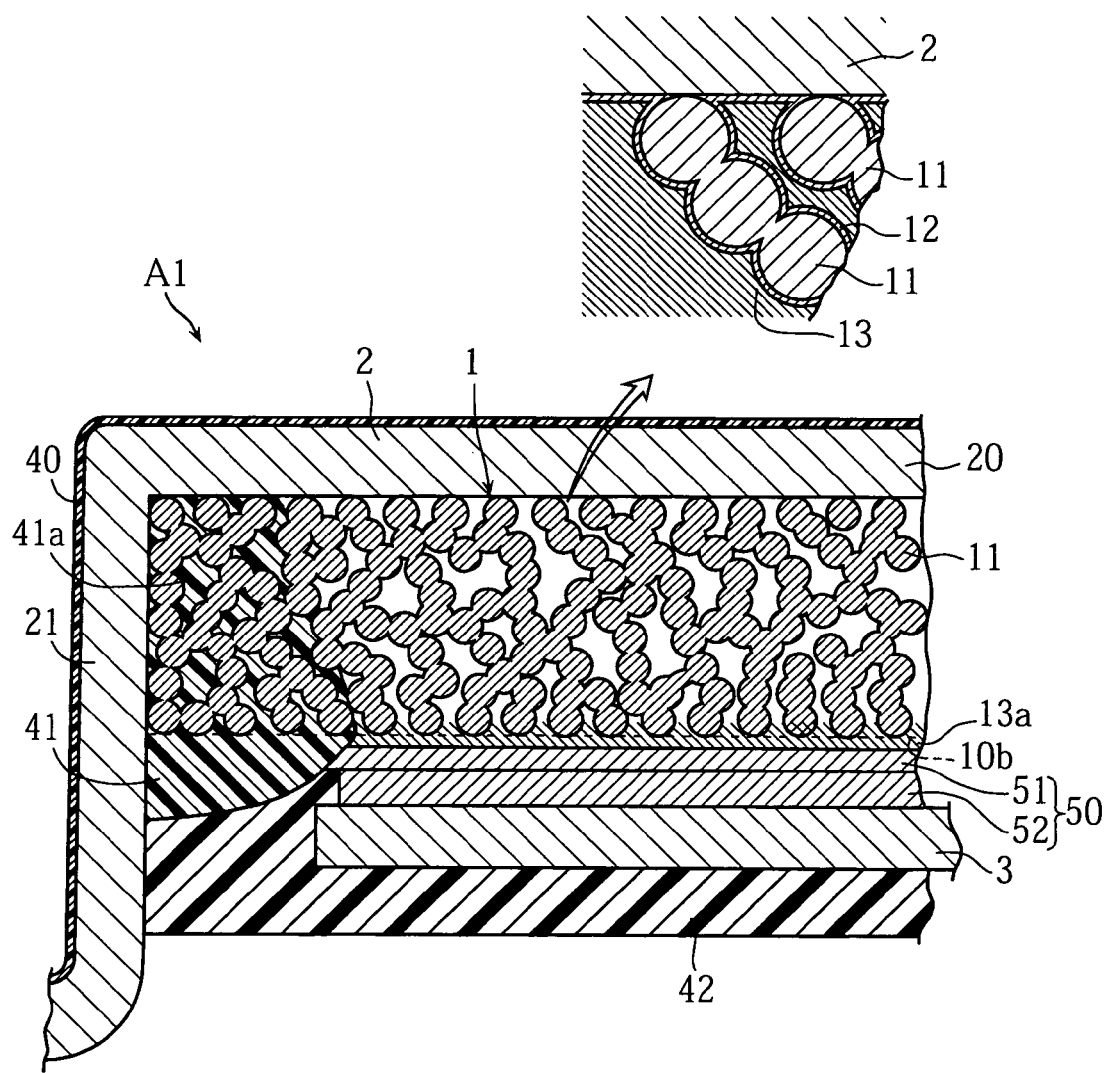
FIG. 4 is an enlarged view schematically showing the structure of a principal portion of the solid electrolytic capacitor shown in FIG. 1.

As shown in FIG. 4, the porous sintered body 1 includes sintered portions 11 provided by sintering niobium powder, and a slight gap is defined between the sintered portions 11. On the surfaces of the sintered portions 11, a dielectric layer 12 made of niobium oxide, for example, is formed. On the surfaces of the dielectric layer 12, a solid electrolyte layer 13 as a cathode is formed. The solid electrolyte layer 13 is made of manganese dioxide or conductive polymer, for example, and preferably, so formed as to completely fill the gap. (In FIG. 4, part of the solid electrolyte layer 13 is omitted.) However, the peripheral portion of the porous sintered body 1 is impregnated with insulating resin 41a, and the solid electrolyte layer 13 is not formed at the resin-impregnated portion. Part of the resin 41a bulges downward from the lower surface 10b of the porous sintered body 1 to provide an insulating layer 41. The insulating layer 41 is in the form of a frame extending along the periphery of the surface 10b. Of the solid electrolyte layer 13, the portion 13a on the surface 10b of the porous sintered body 1 is formed limitedly so as not to cover the entirety of the insulating layer 41. The insulating layer 41 prevents the solid electrolyte layer 13 from coming into contact with the side plate portions 21 of the metal case 2 and provides insulation between the solid electrolyte layer 13 and the metal case 2. In the present invention, an electrolytic polymerization film may be formed on the portion 13a of the solid electrolyte layer 13.

The auxiliary metal plate 3 is electrically connected to the solid electrolyte layer 13 and in the form of a rectangular flat plate. The auxiliary metal plate 3 may be made of valve metal or may be made of copper alloy (or nickel alloy). The auxiliary plate 3 is bonded to the portion 13a of the solid electrolyte layer 13 via the conductive layer 50. The conductive layer 50 comprises a graphite layer 51 and a solidified silver paste layer 52, for example. As shown in FIGS. 2 and 3, the auxiliary metal plate 3 is formed with a cathode terminal 34 extending from the inside to the outside of the metal case 2 by passing through a cutout 25 formed at the side plate portion 21 of the metal case 2. The sealing resin 42 is provided in the metal case 2 to cover portions of the auxiliary metal plate 3 other than the cathode terminal 34. The sealing resin 42 closes the downward opening of the metal case 2.

An example of method for manufacturing the solid electrolytic capacitor A1 will be described below.

Figure 5A:
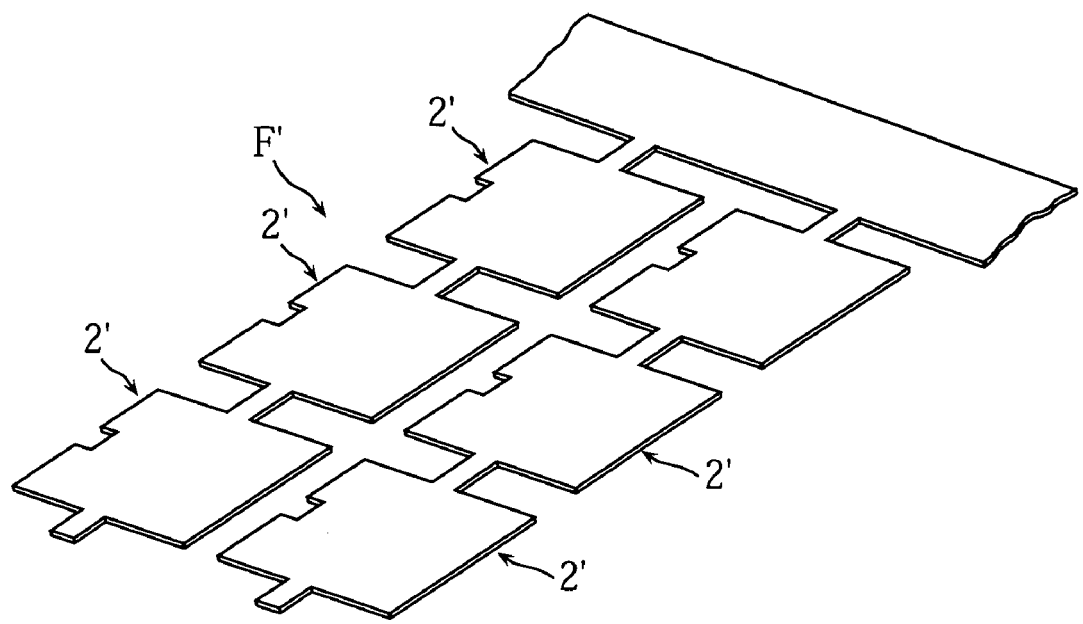
Figure 5B:
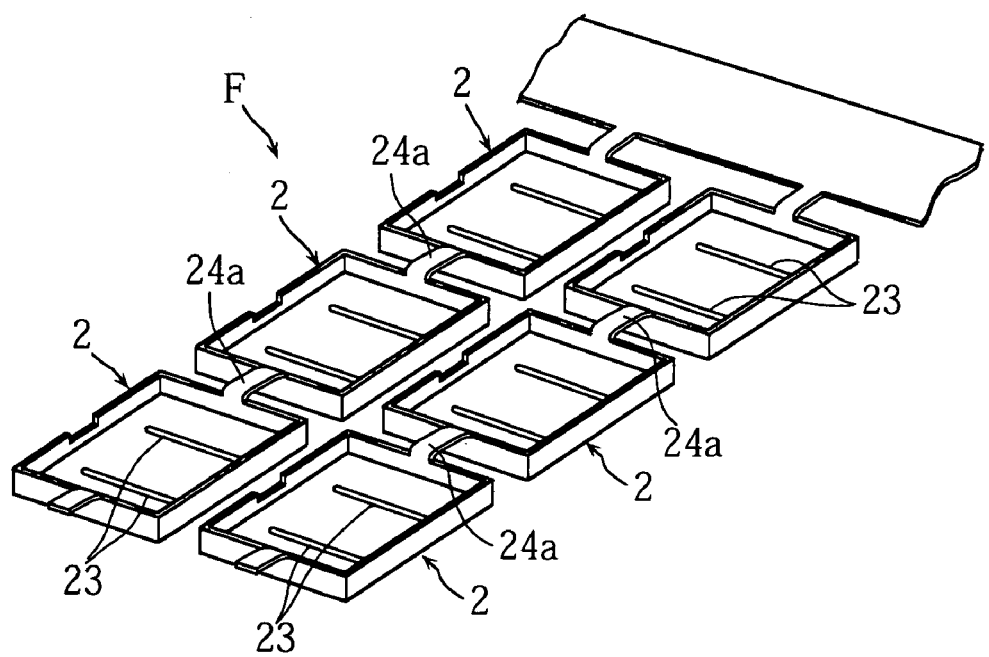
FIG. 5B is a perspective view showing the metal frame in the worked state.

First, a metal frame F' having a shape as shown in FIG. 5A is prepared. The metal frame F' may be prepared by punching a flat plate made of niobium, for example, and includes a plurality of sections 2' each as the original form of a metal case 2. The metal frame F' is subjected to deep drawing to provide a metal frame F as shown in FIG. 5B. The metal frame F includes a plurality of metal cases 2 connected to each other via connecting portions 24a in the form of a strip. After the metal frame F is prepared in this way, wires 23 made of niobium are welded to the main plate portions 20 of the metal cases 2. (In the illustrated example, two wires 23 are welded to each of the cases 2.) Preferably, before the welding of the wires 23, the metal frame F is washed with hydrofluoro-nitric acid, for example. The washing may be performed after the welding of the wires 23.

Figure 6A:
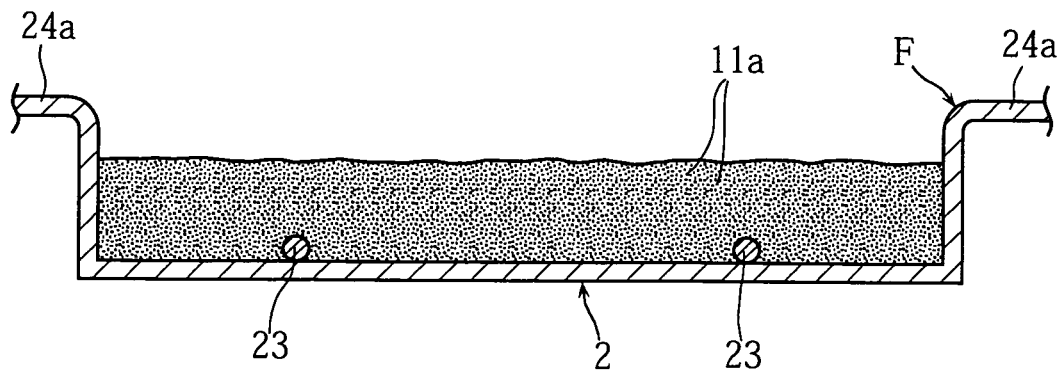
Figure 6B:
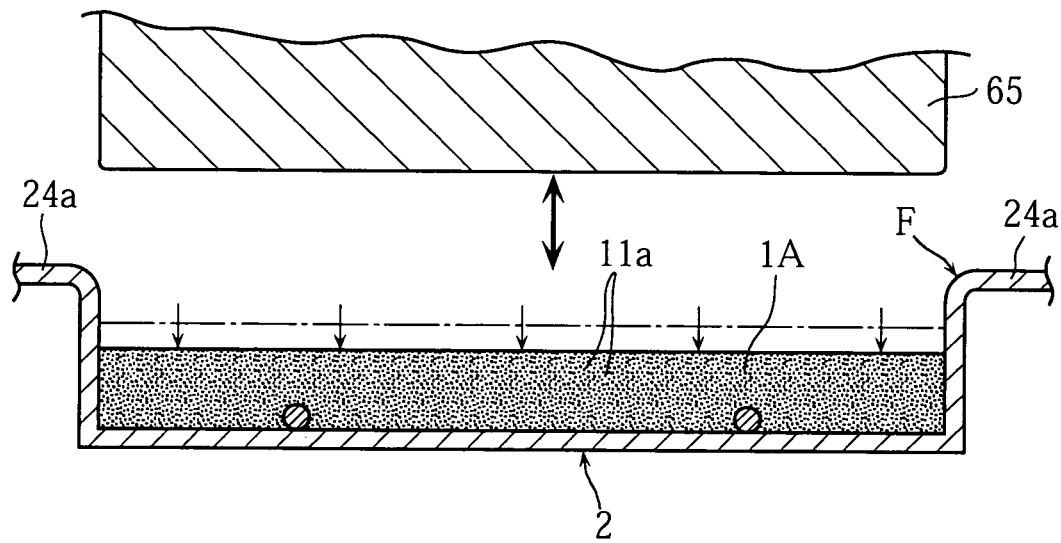
FIG. 6B is a sectional view showing the process step of compacting the powder.
Figure 7:
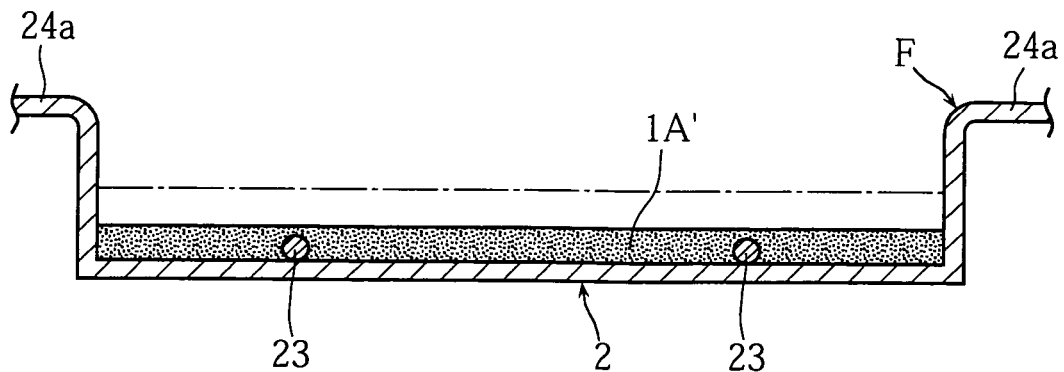
FIG. 7 is a sectional view showing another example of process step for forming a porous body by using a metal case.

Subsequently, as shown in FIG. 6A, niobium powder 11a is put into each of the metal cases 2. Then, the powder 11a is compacted using an appropriate pressing member 65 as shown in FIG. 6B. By the compacting, a porous body 1A of niobium is provided. In the present invention, the porous body 1A may be formed by performing the compacting operation a plurality of times instead of forming the porous body by single compacting operation. Specifically, as shown in FIG. 7, a porous sintered body 1A' having a thickness which is smaller than an intended thickness is formed by the first compacting operation. Subsequently, after niobium powder is added to the porous sintered body 1A', the second compacting operation is performed. Generally, in forming a porous body 1A by compacting powder such as niobium powder, the degree of compaction is higher at portions close to the center of the porous body and lower at portions close to the periphery of the porous body. Therefore, to form a porous body having large length and width, it is preferable to make the degree of compaction generally uniform throughout the porous body by performing the adding and compacting of niobium powder a plurality of times.

Figure 8:
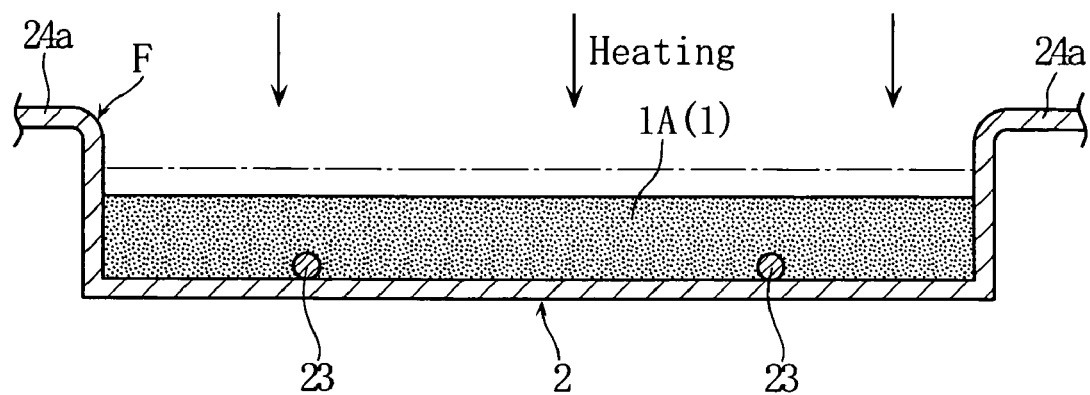
FIG. 8 is a sectional view showing the process step of forming a porous sintered body by heating the porous body.

After the porous body 1A is formed, the porous body 1A is heated in the state housed in the metal case 2, as shown in FIG. 8. By sintering the niobium powder in this way, a porous sintered body 1 is provided. Preferably, the heating is performed in e.g. an argon gas atmosphere to prevent oxidation and nitriding.

Figure 9:
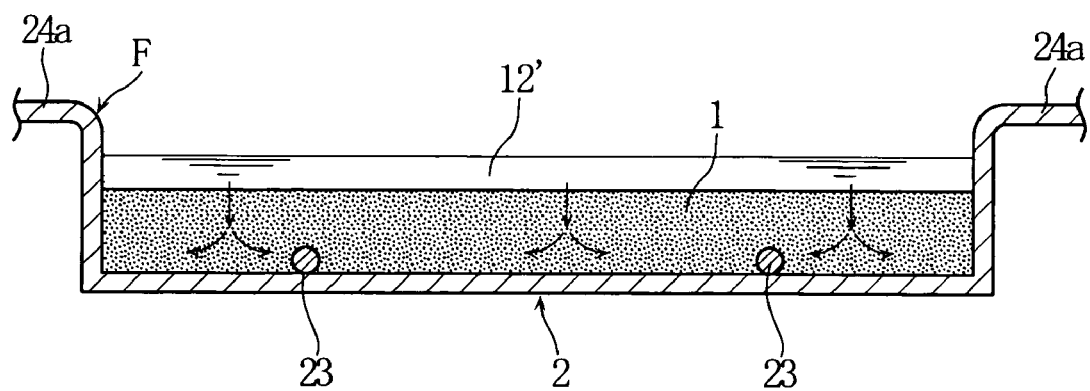
FIG. 9 is a sectional view showing the process step of forming a dielectric layer on the porous sintered body.

After the porous sintered body 1 is formed, conversion treatment is performed to form a dielectric layer 12 in the porous sintered body 1 and at the inner surface of the metal case 2. For instance, the conversion treatment is performed by pouring an aqueous solution of phosphoric acid 12' into the metal case 2, as shown in FIG. 9. With the metal case 2 open upward, the aqueous solution of phosphoric acid 12' stored in the metal case 2 gradually permeates into the porous sintered body 1 from the upper portion toward the inner portion. As a result, the inside of the porous sintered body 1 and the inner surface of the metal case 2 are oxidized, whereby the dielectric layer 12 is formed. After the dielectric layer 12 is formed, the aqueous solution of phosphoric acid 12' can be easily discharged from the metal case 2 by turning over the metal case 2, for example. Alternatively, in the present invention, the dielectric layer can be formed by a conventional technique, i.e., by immersing the porous sintered body in an aqueous solution of phosphoric acid stored in a vessel.

Figure 10:
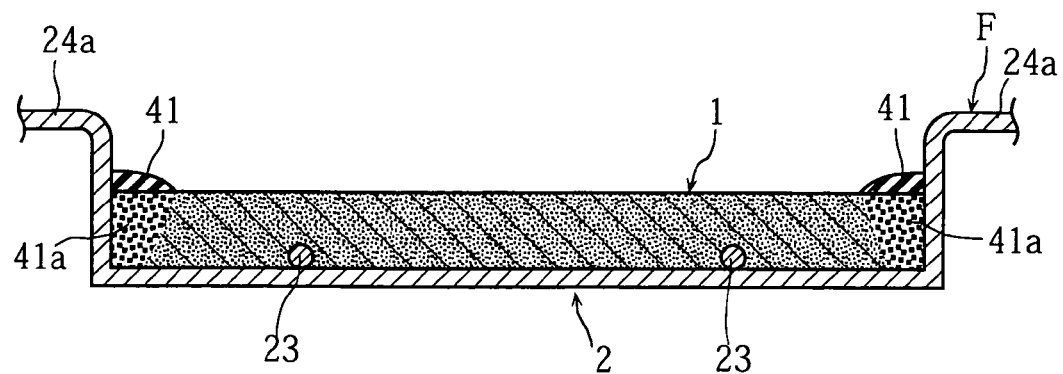
FIG. 10 is a sectional view showing the process step of forming a resin layer on the porous wintered body.

After the conversion treatment, an insulating layer 41 is formed on the periphery of the porous sintered body 1, as shown in FIG. 10. Specifically, resin 41a having flowability, for example, is applied onto the periphery of the porous sintered body 1. Part of the resin 41a is caused to sufficiently permeate into the periphery of the porous sintered body 1. Thereafter, the resin 41a is hardened, whereby the insulating layer 41 is provided.

Figure 11:
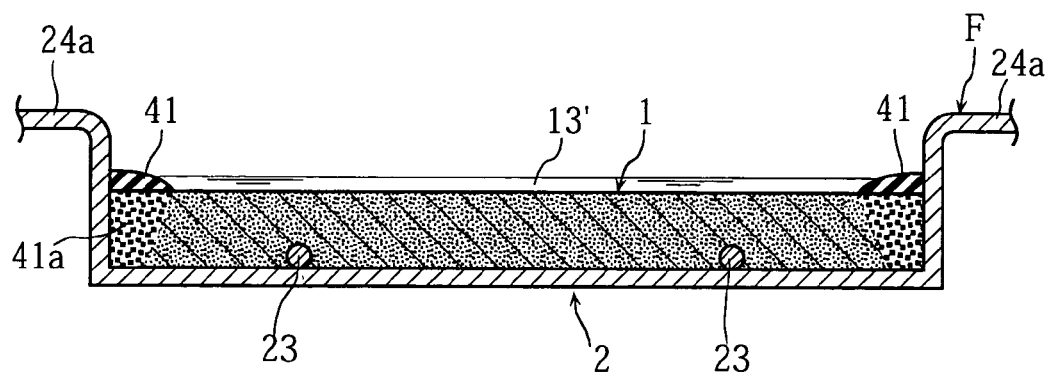
FIG. 11 is a sectional view showing the process step of forming a solid electrolyte layer on the porous sintered body.

Subsequently, a solid electrolyte layer 13 is formed. As shown in FIG. 11, this operation is performed by pouring treatment liquid 13' such as manganese nitrate solution or conductive polymer liquid into the metal case 2. With this technique, similarly to the formation of the dielectric layer 12 described with reference to FIG. 9, the treatment liquid 13' stored in the metal case 2 gradually permeates into the porous sintered body 1 from the upper portion toward the inner portion. As a result, a solid electrolyte layer 13 made of manganese dioxide or conductive polymer is formed in the porous sintered body 1 and on the upper surface of the porous sintered body. In pouring the treatment liquid 13' into the metal case 2, the level of the treatment liquid is kept lower than the resin layer 41. This is because, when the level of the treatment liquid 13' becomes higher than the resin layer 41, the resulting solid electrolyte layer 13 comes into contact with the side plate portions 21 of the metal case 2, and the insulation therebetween cannot be achieved. In this way, the resin layer 41 serves to properly provide insulation between the solid electrolyte layer 13 and the metal case 2.

Figure 12:
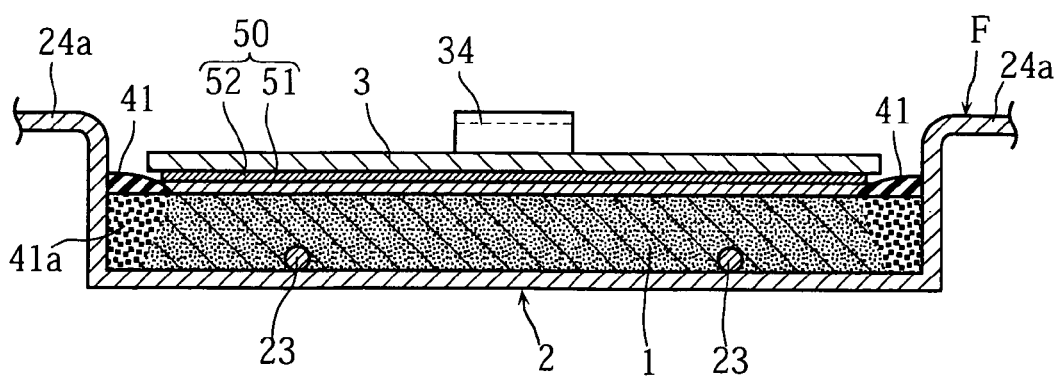
FIG. 12 is a sectional view showing the process step of forming a conductive layer and an auxiliary metal plate on the porous sintered body.
Figure 13:
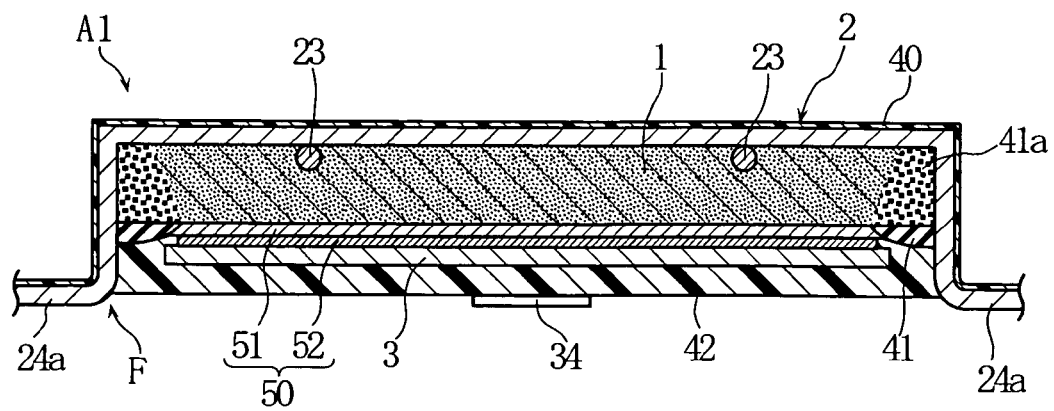
FIG. 13 is a sectional view showing the process step of resin sealing.
Figure 14:
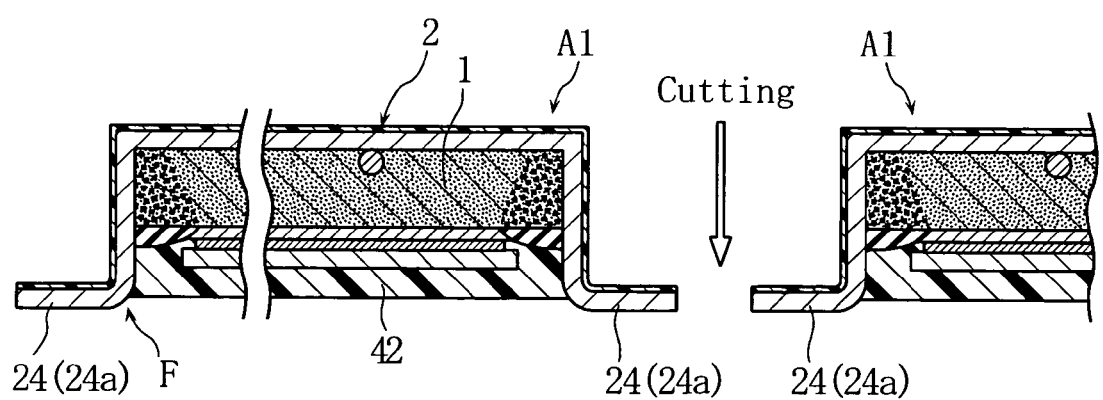
FIG. 14 is a sectional view showing the process step of cutting the metal frame to provide a solid electrolytic capacitor.

As shown in FIG. 12, after the solid electrolyte layer 13 is formed, a conductive layer 50 is formed, and then an auxiliary metal plate 3 is bonded to the conductive layer. Subsequently, as shown in FIG. 13, sealing resin 42 for covering the auxiliary metal plate 30 is provided in the metal case 2, and then a resin layer 40 is formed on the outer surface of the metal frame F. The sealing resin and the resin layer can be easily formed by loading or applying resin and then hardening the resin. By this operation, there is provided an aggregate of a plurality of solid electrolytic capacitors A1 connected to each other via connecting portions 24a of the metal frame F. Then, as shown in FIG. 14, each of the connecting portions 24a is cut. By this cutting operation, each of the connecting portions 24a becomes two anode terminals 24, and a plurality of individual solid electrolytic capacitors A1 are provided.

In the above-described manufacturing method, to provide the porous sintered body 1 accommodated in the metal case 2, niobium powder is directly put into the metal case 2 and then compacted and sintered. Therefore, the productivity of the solid electrolytic capacitor A1 is enhanced. Further, each of the dielectric layer 12 and the solid electrolyte layer 13 is formed by pouring the treatment liquid necessary for forming the layer into the metal case 2 to cause the treatment liquid to permeate into the porous sintered body 1. This operation is easy and reliable, and the waste of the treatment liquid is small. Moreover, by the use of a metal frame F including a plurality of metal cases 2, a plurality of solid electrolytic capacitors A1 are obtained from the single frame F, which also enhances the productivity. Therefore, the manufacturing cost of the solid electrolytic capacitor A1 can be advantageously reduced.

Advantages of the solid electrolytic capacitor A1 will be described below.

The porous sintered body 1 is accommodated in the metal case 2 and hence protected by the metal case 2. The porous sintered body 1 is reliably prevented from warping or cracking. Therefore, the porous sintered body 1 can be made large in length and width and flat to provide a solid electrolytic capacitor A1 having a large capacitance and excellent frequency characteristics. The metal case 2 is made of niobium, similarly to the porous sintered body 1, and acts as the anode. Therefore, the entire capacitance can be increased by the provision of the metal case 2.

The metal case 2 has excellent heat dissipation ability and also serves to dissipate heat generated in using the solid electrolytic capacitor A1 to the outside. In the illustrated example, the resin layer 40 is formed on the outer surface of the metal case 2, preventing the metal case 2 from coming into direct contact with the outside air. However, since the case 2 is made of metal and has a high strength, the thickness of the resin layer 40 as the protective layer need not be large. Therefore, the resin layer 40 does not unduly hinder the heat dissipation by the metal case 2. With such a structure, the temperature rise of the porous sintered body 1 is suppressed, so that the firing or fuming of the porous sintered body 1 is reliably prevented. Since the porous sintered body 1 is accommodated in the metal case 2 and further covered by the sealing resin 42, its contact with air is prevented, which prevents the firing further reliably.

In the solid electrolytic capacitor A1, the metal case 2 serving as the anode includes the paired anode terminals 24, and a circuit current can flow through the metal case 2. Therefore, the noise cancellation performance is enhanced, as will be described below.

Figure 15:
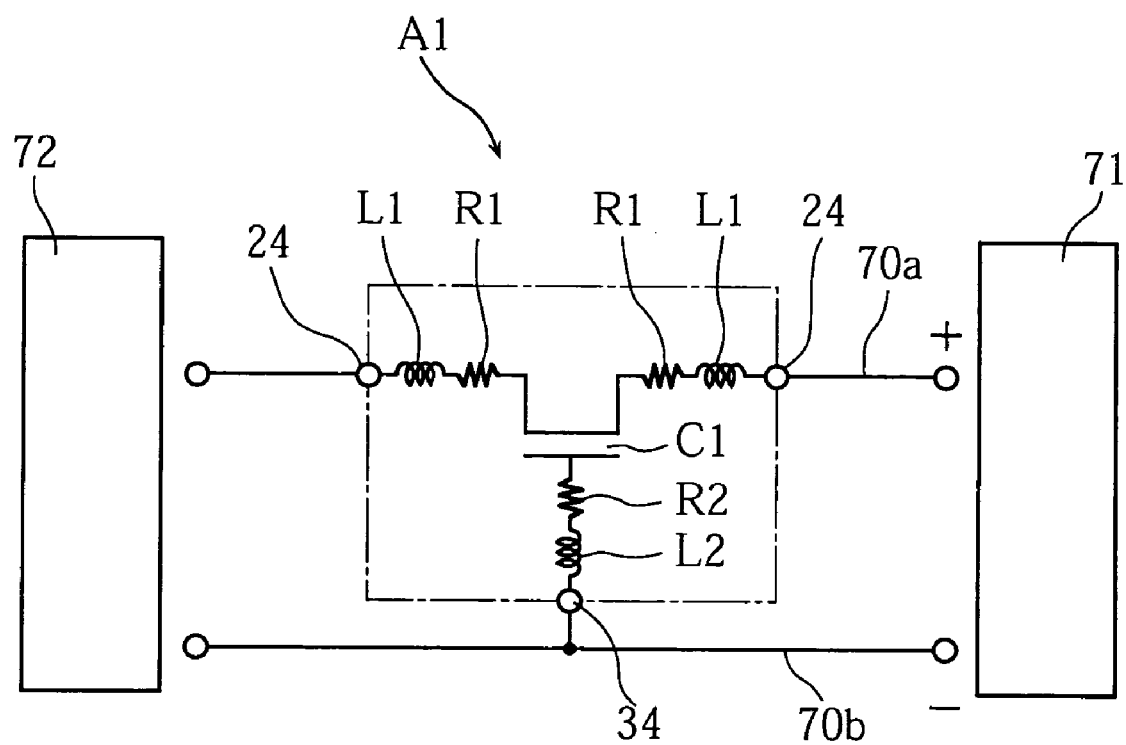
FIG. 15 illustrates an example of electric circuit using the solid electrolytic capacitor of FIG. 1.

As shown in FIG. 15, the solid electrolytic capacitor A1 is connected, in use, between a power supply 71 and a circuit 72. The circuit 72 may comprise a CPU or an IC, for example. The paired anode terminals 24 of the solid electrolytic capacitor A1 is connected in series to the wiring 70a of the positive pole side from the power supply 71 to the circuit 72. The cathode terminal 34 is connected to the wiring 70b of the negative pole side. With such an arrangement, all the current flowing through the wiring 70a of the positive pole side flows into the metal case 2. The equivalent series inductance L1 of the metal case 2 of the solid electrolytic capacitor A1 is connected in series to the wiring 70a. The equivalent series inductance L1 acts as a resistor relative to an alternating current, and the resistance (impedance) is proportional to the frequency. Therefore, the higher the frequency of the noise the current flowing through the solid electrolytic capacitor A1 includes, the larger resistance to the noise the equivalent series inductance L1 provides. Thus, the solid electrolytic capacitor A1 produces a large insertion loss in a high frequency band and hence can properly cancel noises in a high frequency band.

Figure 16:
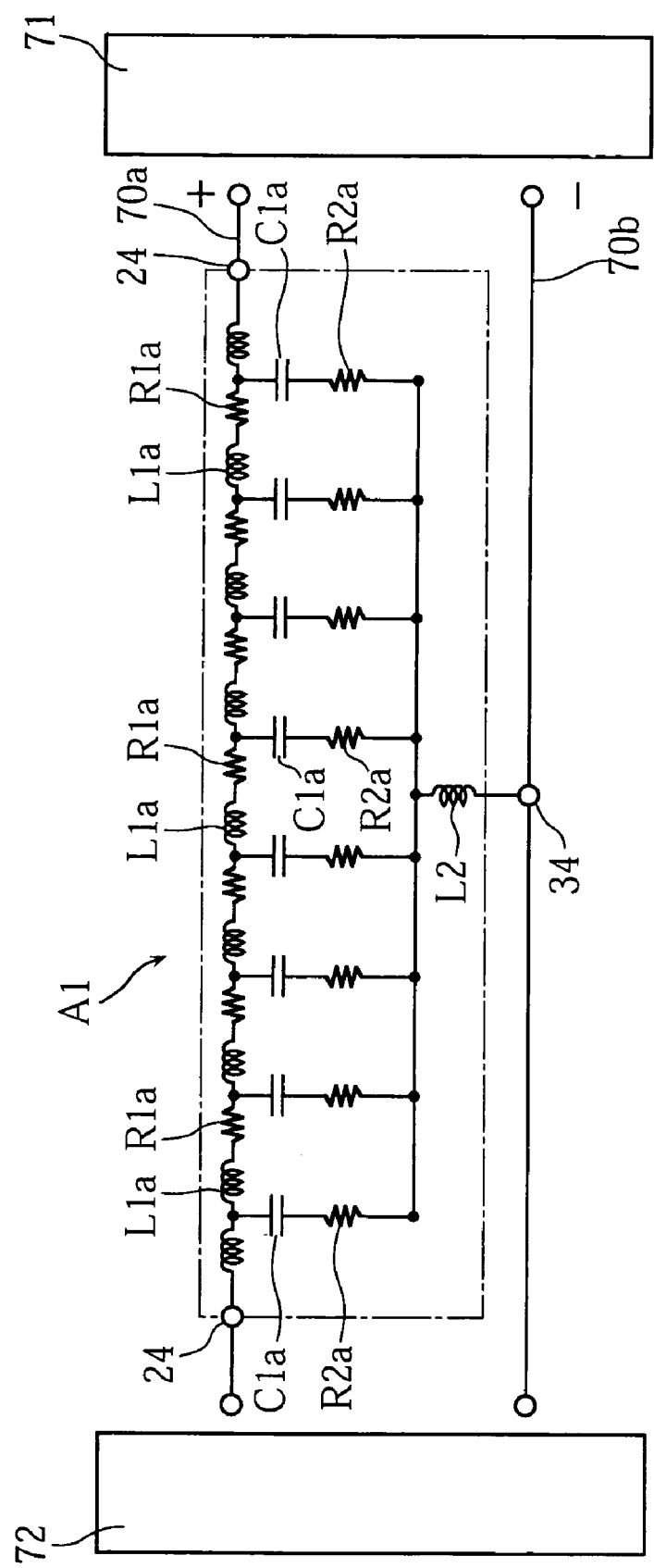
FIG. 16 is a conceptual diagram for describing the solid electrolytic capacitor in the electric circuit shown in FIG. 15.

The solid electrolytic capacitor A1 is electrically equivalent to a plurality of capacitors C1a of a small capacitance connected to each other as shown in FIG. 16. When a current including noises of a high frequency band flows through the solid electrolytic capacitor A1, the assembly of a small number of capacitors C1a act equivalently to a capacitor having a small capacitance and inductance. Therefore, the noises flow toward the cathode side through these capacitors C1a and are removed. On the other hand, when a current including noises of a low frequency band flows, a large number of capacitors C1a act as a capacitor having a large capacitance. In a low frequency band, the power loss of a capacitor is determined depending on the impedance which depends on the capacitance. The impedance is inversely proportional to the capacitance, and a larger capacitance provides a lower impedance with respect to a low frequency band. Therefore, in the solid electrolytic capacitor A1, noises of a low frequency band can also be properly removed.

Moreover, since the metal case 2 and the porous sintered body 1 have a small thickness, the current path in the thickness direction is short, so that the equivalent internal series resistance R1a, R2a is low. Therefore, the noises of the alternating current component readily flow to the cathode side, which also enhances the noise cancellation performance.

FIGS. 17-26 show variations of the first embodiment described above. In these figures, the elements which are identical or similar to those of the first embodiment are designated by the same reference signs as those used for the first embodiment.

Figure 17:
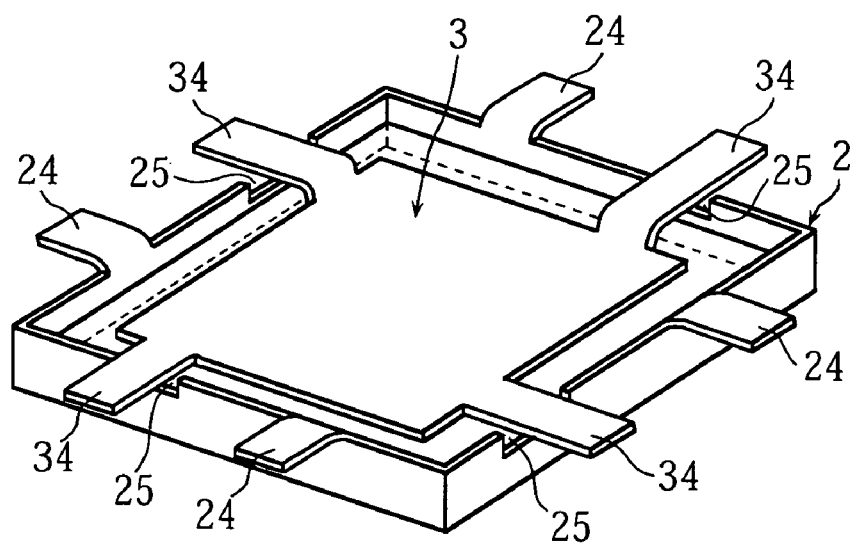
FIG. 17 is a perspective view showing a variation of the metal case and the auxiliary metal plate.

In the structure shown in FIG. 17, the metal case 2 is formed with four anode terminals 24. The auxiliary metal plate 3 is formed with four cathode terminals 34. The metal case 2 is formed with cutouts 25 for allowing the four cathode terminals 34 to pass therethrough. (In this figure, the illustration of parts other than the metal case 2 and the auxiliary metal plate 3 is omitted.)

In the structure shown in FIG. 17, four cathode terminals 34 are provided. Therefore, in flowing a current from the metal case 2 to the cathode side, the current can be distributed to the four cathode terminals 34. Therefore, the internal resistance is reduced, which leads to the suppression of heat generation and the enhancement of the frequency characteristics. These advantages are not limited to the structure including four cathode terminals 34 and can be obtained by the provision of at least two cathode terminals 34. One of the four anode terminals 24 may be connected to the input side of the wiring of the positive pole, whereas the other three of the four anode terminals 24 may be connected to output side of the wiring of the positive pole. This arrangement is equivalent to the arrangement in which respective inductances of the three anode terminals 24 are connected in parallel, and the inductance of the entirety of the output side becomes small. As a result, the speed of current output and the responsiveness in using the solid electrolytic capacitor for supplying power are improved. The number of anode terminals 24 is not limited to four, and the advantages can be obtained by providing at least three anode terminals. (One is connected to the input side, whereas the other two are connected to the output side.)

Figure 18:
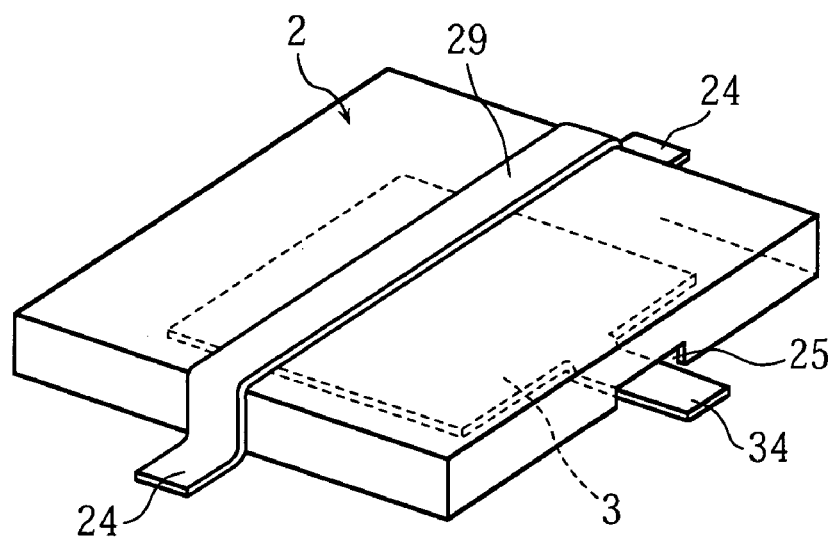
FIG. 18 is a perspective view showing a variation of the method for providing an anode terminal at the metal case.

In the structure shown in FIG. 18, a metal member 29 in the form of a strip is welded to an outer surface of the metal case 2. The longitudinally opposite ends of the metal member 29 provide anode terminals 24 which are bent to extend outward from the metal case 2. Similarly to the metal case 2, the metal member 29 may be made of niobium.

In the structure shown in FIG. 18, since the metal member 29 is welded to the metal case 2, the metal case 2 is reinforced by the metal member 29. Particularly when the metal member 29 extends from one end to the other end of the metal case 2 as shown in the figure, the metal case 2 is effectively reinforced. Therefore, it is possible to make the metal case 2 using a thin metal plate, which leads to the material cost reduction.

Figure 19:
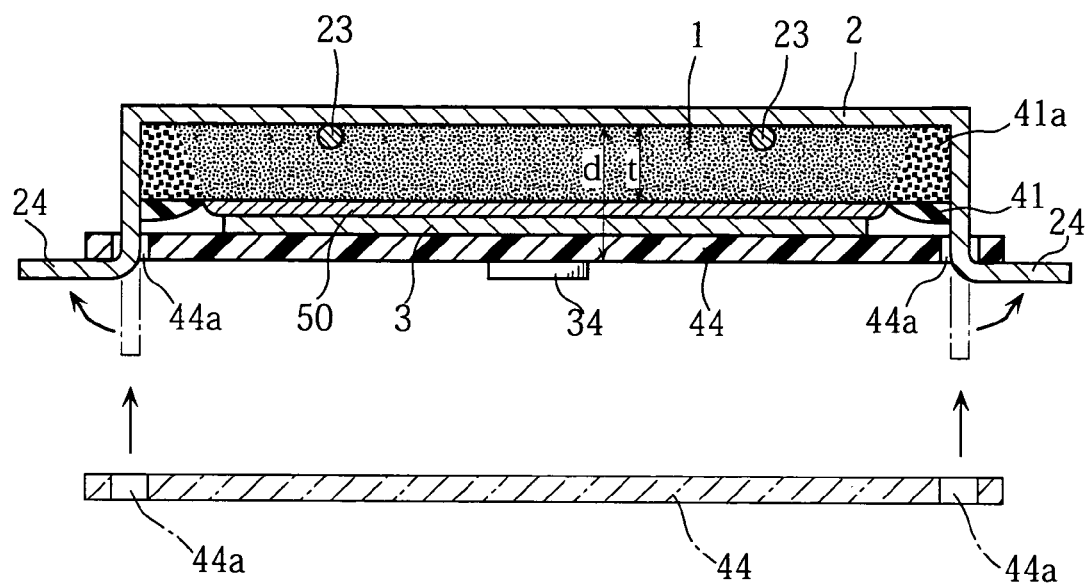
FIG. 19 is a sectional view showing a variation of the solid electrolytic capacitor according to the present invention.

In the structure shown in FIG. 19, the opening of the metal case 2 is closed by a plate 44 made of resin. The plate 44 is formed with holes 44a into which respective base portions of the anode terminals 24 are inserted so that the plate 44 does not come off from the metal case 2. This structure can be obtained by forming anode terminals 24 having a straight configuration as indicated by the phantom lines in the figure, inserting the anode terminals 24 into the holes 22a of the plate 44, and then bending the anode terminals 24 as indicated by the solid lines in the figure. With this structure, the plate 44 protects the interior of the metal case 2. Further, the plate 44 reinforces the metal case 2.

Figure 20:
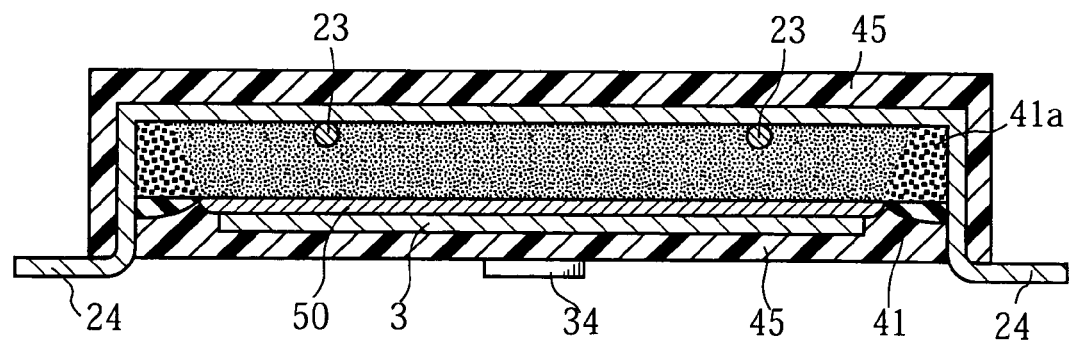
FIG. 20 is a sectional view showing another variation of the solid electrolytic capacitor according to the present invention.

In the structure shown in FIG. 20, the entirety of the metal case 2 except for the anode terminals 24 and the cathode terminal 34 are sealed in sealing resin 45. The opening of the metal case 2 is also closed by the resin 45. With such a structure, both of the insulation of the outer surface of the metal case 2 and the closing of the opening are achieved by the sealing resin 45 alone. Therefore, as compared with the structure in which two separate resin members are used for such purposes, the manufacturing steps and hence the manufacturing cost can be reduced. Moreover, the metal case 2 and other intended portions can be sealed without leaving any gap.

Figure 21:
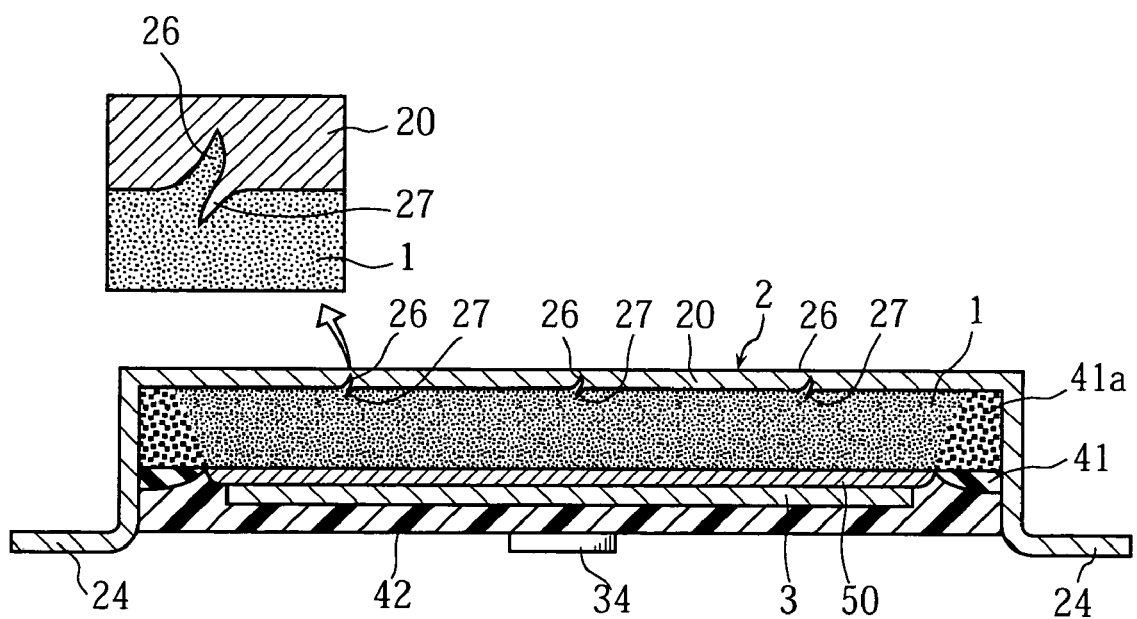
FIG. 21 is a sectional view showing another variation of the solid electrolytic capacitor according to the present invention.

In the structure shown in FIG. 21, a plurality of recesses 26 are formed at the lower surface of the main plate portion 20 of the metal case 2. Each of the recesses 26 may be formed by cutting the main plate portion 20, and the edge of the recess is formed with a burr 27. The burr 27 cuts into the porous sintered body 1. Part of the porous sintered body 1 enters the recess 26.

With such a structure, similarly to the wires 23 described before, the burrs 27 have an anchoring effect, so that the bonding strength between the main plate portion 20 and the porous sintered body 1 is enhanced. Further, since part of the porous sintered body enters the recesses 26, the bonding strength is further enhanced. The burrs 27 are inevitably formed in cutting the main plate portion 20 to form the recesses 26 by. Therefore, the operation to form the burrs 27 need not be performed separately from the operation to form the recesses 26. The formation of the recesses 26 (and hence, the formation of the burrs 27) is easier than the welding of the wires 23 to the metal case 2. Moreover, since the formation of the recesses 26 and the burrs 27 does not require any member other than the metal case 2, the manufacturing cost can be advantageously reduced.

Figure 22A:
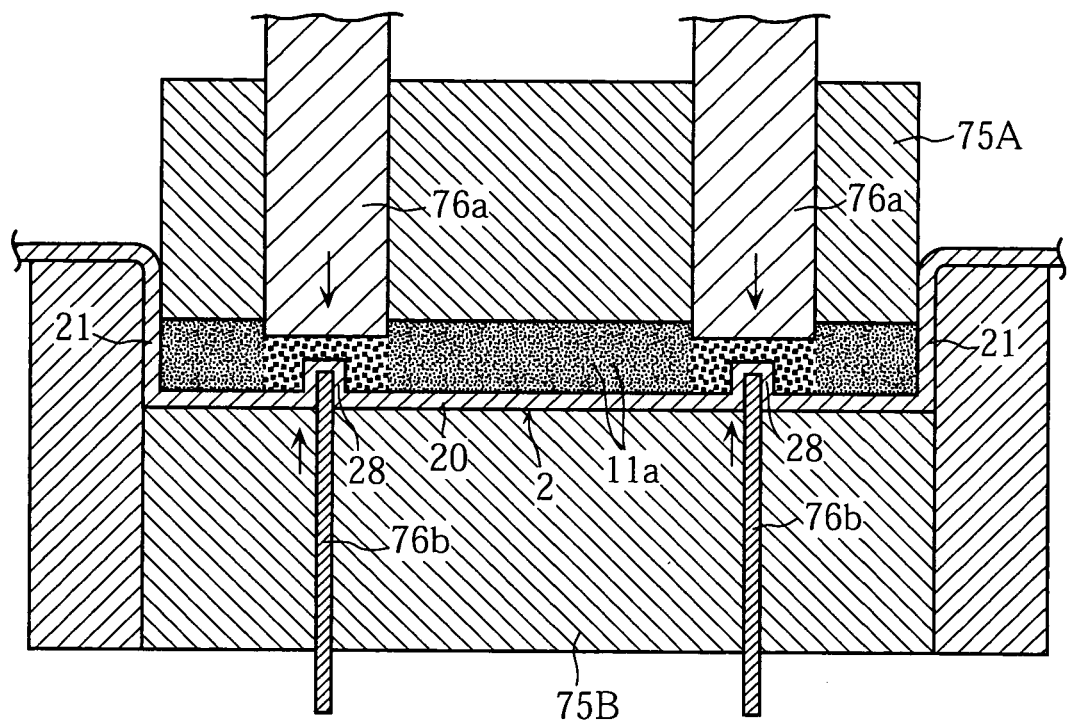
Figure 22B:
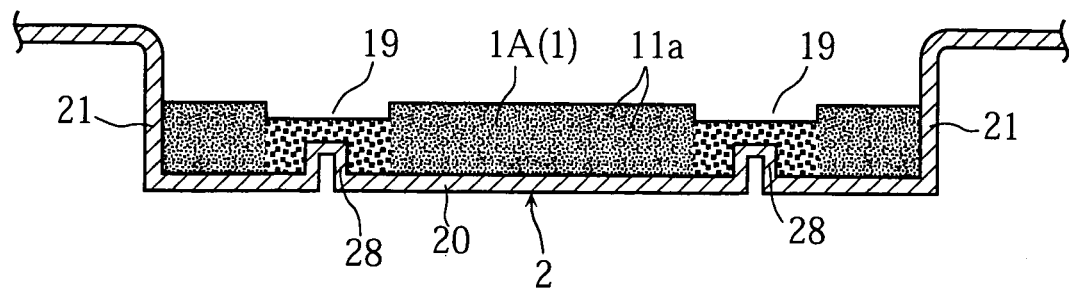
FIG. 22B is a sectional view showing the porous body obtained by the process step of FIG. 22A.

In the present invention, the compaction of niobium powder 11a may be performed by the method shown in FIG. 22A. Specifically, the niobium powder 11a put into the metal case 2 is compacted by using an upper mold member 75A and a lower mold member 75B. In the compacting process, part of the main plate portion 20 of the metal case 2 is pressed upward by a plurality of pressurizing rods 76b provided at the lower mold member 75B, whereby projections 28 are formed at the main plate portion 20. Further, by using a plurality of pressuring rods 76a provided at the upper mold member 75A, the niobium powder 11a at portions above the projections 28 and the nearby portions is pressed more strongly than other portions. As a result, as shown in FIG. 22B, the porous body 1A is obtained which is formed with recesses 19 at positions corresponding to the projections 28 of the metal case 2. The porous body 1A is then baked to become the porous sintered body 1.

With the above method, the niobium powder 11a is densely compacted at portions around the projections 28 of the metal case 2 to embed the projections 28. Therefore, the bonding strength between the porous sintered body 1 and the metal case 2 is enhanced. Since the bonding strength is enhanced without welding an additional member to the metal case 2 or particularly working the metal case 2 by a process other than the pressing, the manufacturing cost can be reduced.

Figure 23:
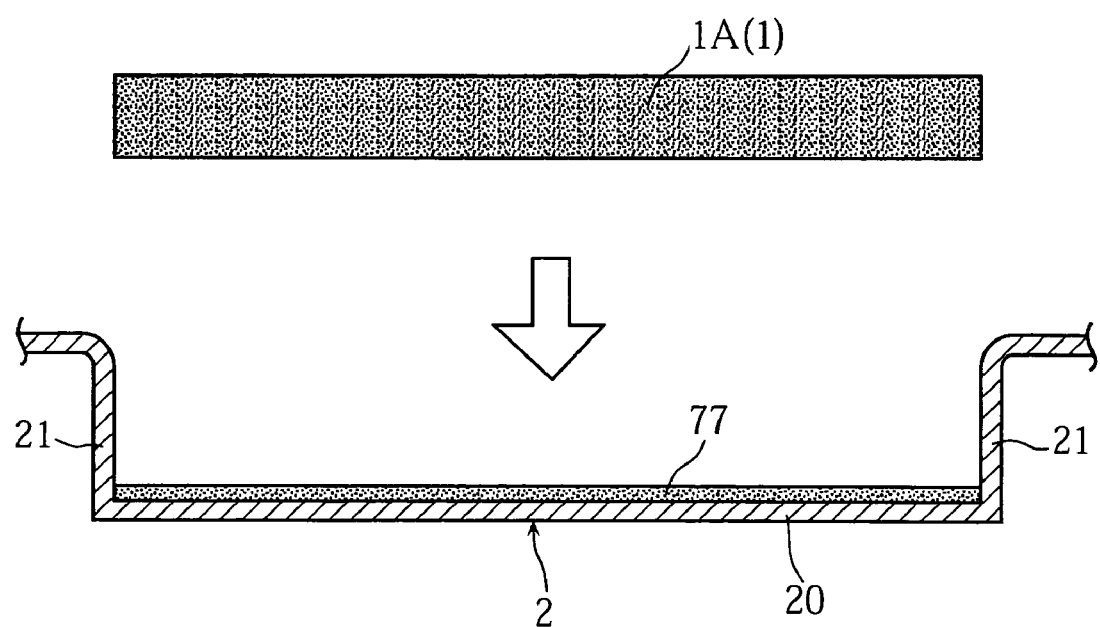
FIG. 23 is a sectional view showing a variation of the method for manufacturing a solid electrolytic capacitor according to the present invention.

In the structure shown in FIG. 23, the porous body 1A is prepared separately from the metal case 2. Thereafter, the porous body 1A is bonded to the metal case 2 via conductive paste 77 containing valve metal powder. The porous body 1A is then heated while being accommodated in the metal case 2, whereby the porous sintered body 1 is obtained. Also with this method, a porous sintered body which the present invention intends to provide can be manufactured.

Unlike the above method, the porous sintered body 1 after having undergone the sintering process may be bonded to the metal case 2 via the conductive paste 77.

Figure 24:
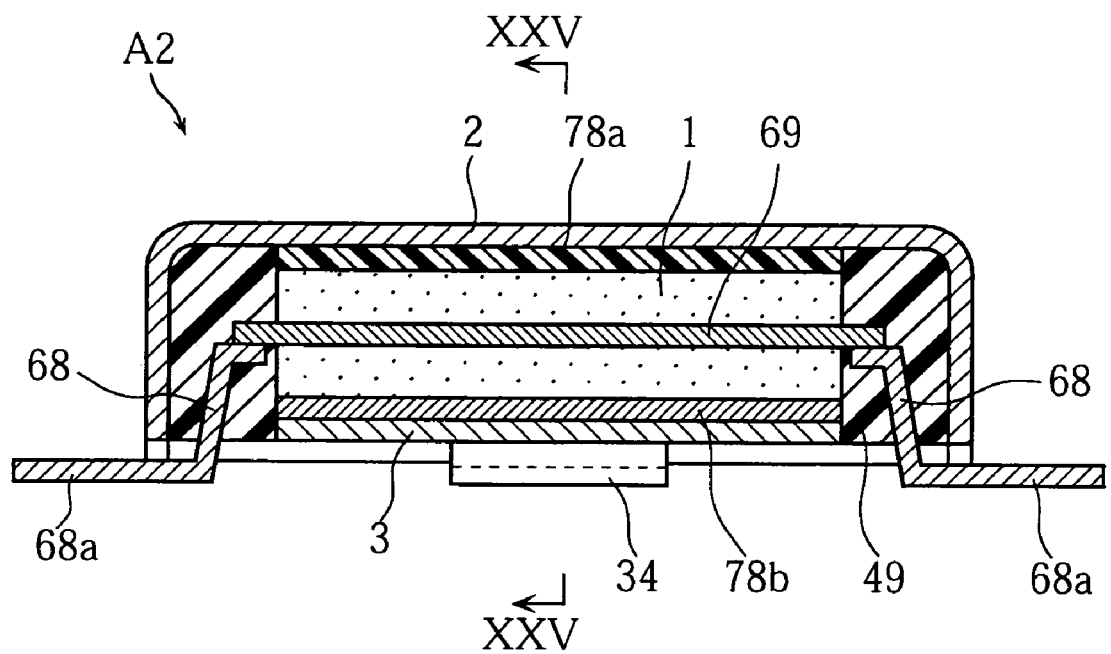
FIG. 24 is a sectional view showing a solid electrolytic capacitor according to a second embodiment of the present invention.
Figure 25:
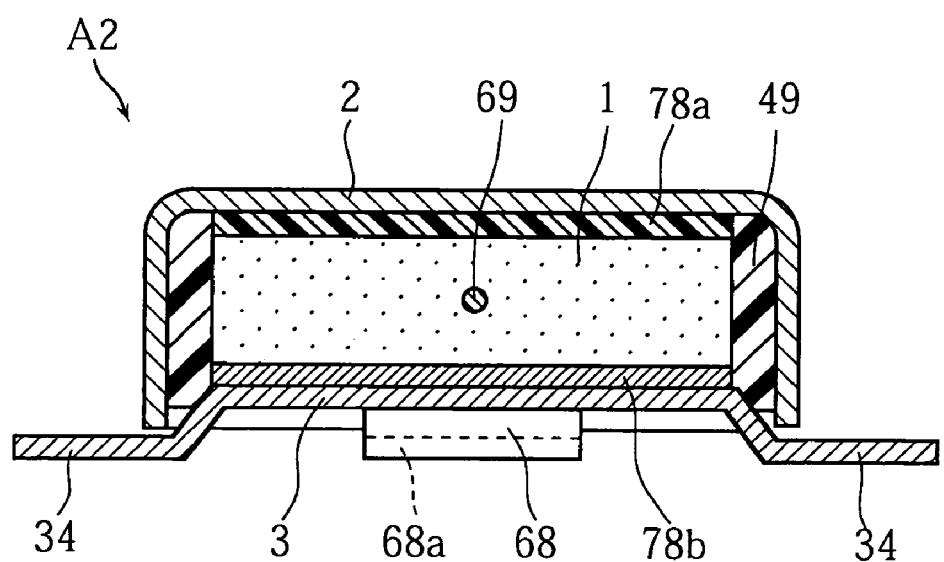
FIG. 25 is a sectional view taken along lines XXV-XXV in FIG. 24.
Figure 26:
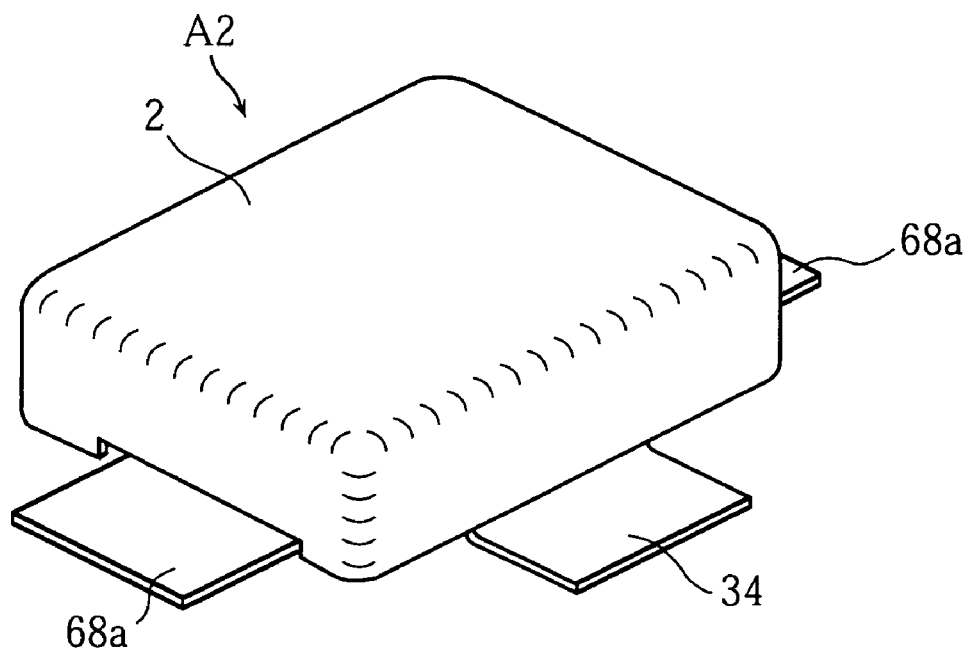
FIG. 26 is a perspective view showing the solid electrolytic capacitor of FIG. 24.

FIGS. 24-26 illustrate a solid electrolytic capacitor A2 according to a second embodiment of the present invention. The capacitor A2 includes a porous sintered body 1 and an anode wire 69 penetrating through the porous sintered body 1. The structure of the porous sintered body 1 itself is similar to that of a conventional porous sintered body made of niobium, and includes a dielectric layer and a solid electrolyte layer (not shown) formed on the surfaces of the sintered body of niobium powder. The metal case 2 is made of copper alloy or nickel alloy, for example, and bonded to the solid electrolyte layer on the upper surface of the porous sintered body 1 via a bonding material 78a having an electrical insulating property. Similarly to the first embodiment, the porous sintered body 1 acts as an anode. However, the metal case 2 is insulated from the porous sintered body 1 and does not act as an anode.

The porous sintered body 1 is accommodated in the metal case 2 and is sealed in the sealing resin 49. The anode wire 69 has opposite ends each of which a metal plate 68 is bonded to. Part of each metal plate 68 extends out of the metal case 2, whereby a pair of anode terminals 68a is provided. An auxiliary metal plate 3 is bonded to the solid electrolyte layer on the lower surface of the porous sintered body 1 via a conductive bonding material 78b. Part of the auxiliary metal plate extends out of the metal case 2 to serve as a cathode terminal 34.

In the solid electrolyte capacitor A2 again, the porous sintered body 1 is accommodated in the metal case 2. Therefore, similarly to the solid electrolytic capacitor A1, a large capacitance and excellent frequency characteristics can be obtained by making the porous sintered body large in length and width and flat while preventing the warping or cracking of the porous sintered body 1. Moreover, since the anode wire 69 penetrates through the porous sintered body 1, all the circuit current can be caused to flow into the anode wire 69. Therefore, in the solid electrolytic capacitor A2 again, the same effects as those described with reference to FIG. 15 can be obtained, whereby the noise cancellation performance at a high frequency band is enhanced.

Figure 27:
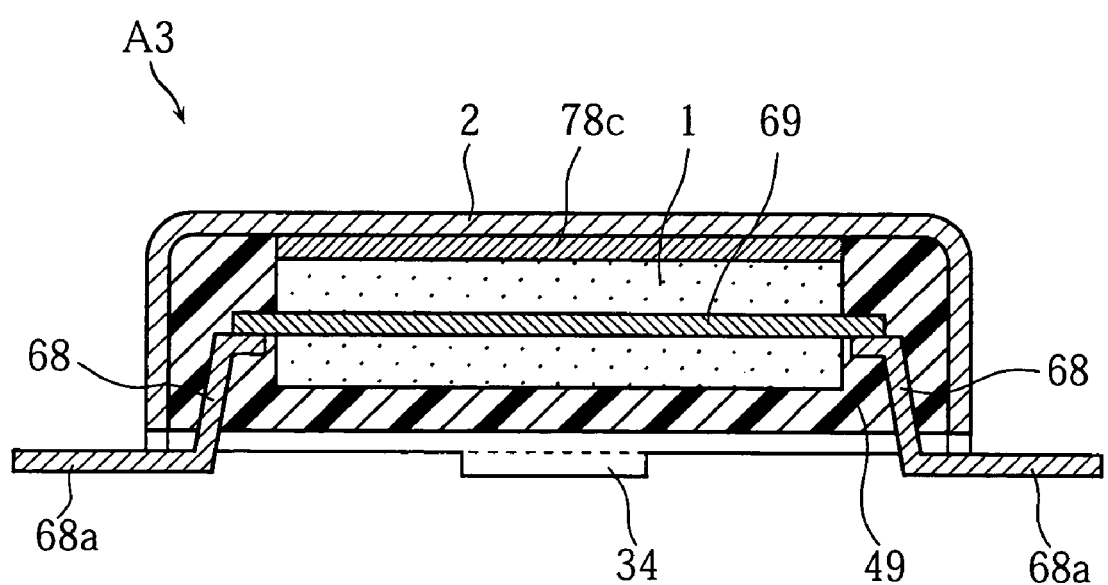
FIG. 27 is a sectional view showing a solid electrolytic capacitor according to a third embodiment of the present invention.
Figure 28:
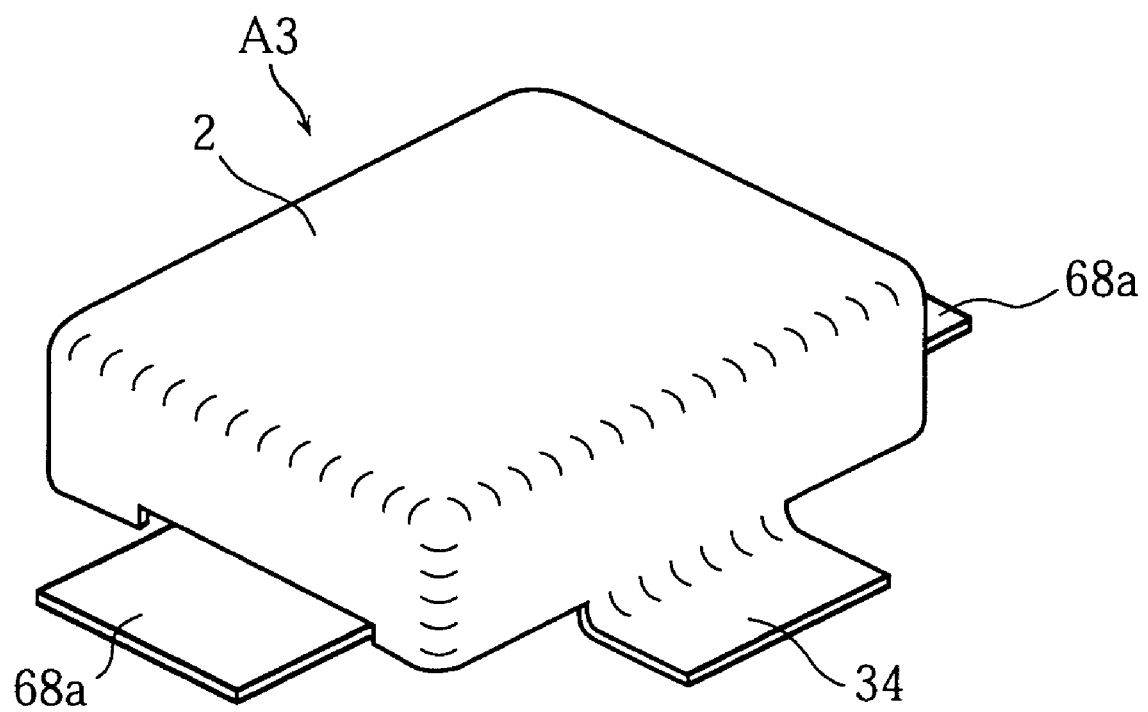
FIG. 28 is a perspective view showing the solid electrolytic capacitor of FIG. 27.

FIGS. 27 and 28 show a solid electrolytic capacitor A3 according to a third embodiment of the present invention. Similarly to the solid electrolytic capacitor A2, the solid electrolytic capacitor A3 includes a porous sintered body 1 and an anode wire 69 penetrating through the sintered body. In the solid electrolytic capacitor A3, the metal case 2 is bonded to the electrolyte layer (not shown) on the upper surface of the porous sintered body 1 via a conductive bonding material 78c. (That is, the metal case 2 is electrically connected to the solid electrolyte layer as the cathode.) The metal case 2 is integrally formed with a pair of cathode terminals 34.

With such a structure, the same advantages as those of the solid electrolytic capacitor A2 are obtained. Further, since the anode terminals 34 are integrally formed on the metal case 2, the auxiliary metal plate 3, which is provided in the solid electrolytic capacitor A2, is not necessary, whereby the manufacturing cost can be reduced.

The present invention is not limited to the foregoing embodiments. For instance, although the anode wire 69 of the solid electrolytic capacitors A2 and A3 penetrates through the porous sintered body 1, the anode wire can be inserted in the porous sintered body 1 only partially so as not to penetrate through the porous sintered body 1. Further, instead of providing the single anode wire 69, a plurality of anode wires 69 may be provided.

The invention claimed is:

1. A solid electrolytic capacitor comprising:
a porous sintered body of valve metal; and
a metal vase accommodating the porous sintered body;
wherein the metal case includes a main plate portion, and a side plate portion standing from a periphery of the main plate portion, the main plate portion and the side plate portion defining a hollow for accommodating the porous sintered body; and
wherein the metal case is provided with a plurality of anode terminals extending outward from the metal case so that a current can flow trough the metal case via the anode terminals.

2. The solid electrolytic capacitor according to claim 1, further comprising a dielectric layer and a solid electrolyte Layer which are formed at the porous sintered body, wherein the solid electrolyte layer acts as a cathode, the metal case is made of valve metal, and the metal case and the porous sintered body are electrically connected to each other to act as an anode.

3. The solid electrolytic capacitor according to claim 2, wherein the porous sintered body includes a first surface, and a second surface opposite to the first surface, the first surface being bonded to the main plate portion of the metal case directly or indirectly.

4. The solid electrolytic capacitor according to claim 3, wherein the first surface of the porous sintered body is bonded to the main plate portion of the metal case via a bonding material containing valve metal powder.

5. The solid electrolytic capacitor according to claim 3, wherein part of the solid electrolyte layer is provided on the second surface of the porous sintered body, and wherein the solid electrolytic capacitor further comprises a metallic connecting member made of metal and bonded to said part of the solid electrolyte layer, part of the metallic connecting member serving as a cathode terminal.

6. The solid electrolytic capacitor according to claim 1, wherein the porous sintered body is flat and has a thickness which is smaller than a depth of the hollow of the metal case.

7. The solid electrolytic capacitor according to claim 1, wherein the anode terminals are integrally formed on the side plate portion of the metal case.

8. The solid electrolytic capacitor according to claim 1, further comprising a metal member made of a same material as the metal case and bonded to the metal case, wherein part of the metal member serves as the anode terminals.

9. A solid electrolytic capacitor comprising:
a porous sintered body of valve metal;
a metal case accommodating the porous sintered body;
a dielectric layer formed on the porous sintered body; and
a solid electrolyte layer formed on the dielectric layer to act as a cathode;
wherein the metal case and the porous sintered body are electrically connected to each other to act as an anode;
wherein the metal case Includes a main plate portion, and a side plate portion standing from a periphery of the main plate portion, the main plate portion and the side plate portion defining a hollow for accommodating the porous sintered body;
wherein the porous sintered body includes a first surface, and a second surface opposite to the first surface, the first surface being bonded to the main plate portion of the metal case directly or indirectly;
wherein part of the solid electrolyte layer is provided on the second surface of the porous sintered body;
wherein the solid electrolytic capacitor further comprises a metallic connecting member made of metal and bonded to said part of the solid electrolyte layer, part of the metallic connecting member serving as a cathode terminal
wherein the metal case is formed with a cutout, and
wherein part of the metallic connecting member extends from inside to outside of the metal case by passing through the cutout 10. The solid electrolytic capacitor according to claim 9, wherein the second surface of the porous sintered body includes a periphery formed with an insulating layer, and wherein said part of the solid electrolyte layer on the second surface is formed at a region surrounded by the insulating layer.

11. The solid electrolytic capacitor according to claim 10, wherein the insulating layer is made of resin, and wherein part of the resin is impregnated into a peripheral portion of the porous sintered body.

12. The solid electrolytic capacitor according to claim 9, wherein the metal case includes an irregular inner surface bonded to the porous sintered body.

13. A solid electrolytic capacitor comprising:
a porous sintered body of valve metal; and
a metal case accommodating the porous sintered body;

wherein the metal case includes an inner surface to which a metal member made of valve metal is welded to form a projection.

14. A solid electrolytic capacitor comprising:
a porous sintered body of valve metal; and
a metal case accommodating the porous sintered body;
wherein the metal case includes an inner surface formed with a plurality of recesses and a plurality of burrs corresponding to the recesses.

15. A solid electrolytic capacitor comprising:
a porous sintered body of valve metal; and
a metal case accommodating the porous sintered body;
wherein the metal case includes an inner surface at which a plurality of projections are formed by partially bulging the metal case.

16. The solid electrolytic capacitor according to claim 15, wherein the metal case includes an opening which is closed with resin.

17. A method for manufacturing a solid electrolytic capacitor including a metal case and a porous sintered body accommodated in the metal case, the method comprising:
preparing the metal case;
preparing the porous sintered body; and
forming a dielectric layer and a solid electrolyte layer at the porous sintered body;
wherein the porous sintered body includes a bonding surface bonded to the metal case and a non-bonding surface which is not bonded to the metal case;
wherein the step of forming the dielectric layer and the solid electrolyte layer comprises forming the dielectric layer and the solid electrolyte layer at an interior and the non-bonding surface of the porous sintered body; and
wherein an insulating layer is formed at a periphery of the non-bonding surface of the porous sintered body before formation of the solid electrolyte layer so that the insulating layer prevents the solid electrolyte layer from being formed at the periphery of the non-bonding surface.

18. The manufacturing method according to claim 17, wherein the preparation of the porous sintered body includes compacting valve metal powder put in the metal case to provide a porous body, and beating the porous body together with the metal case to provide a porous sintered body.

19. The manufacturing method according to claim 17, wherein the preparation of the porous sintered body includes bonding a porous body of valve metal powder into the metal case by using a bonding material containing valve metal powder, and heating the porous body with the metal case to provide a porous sintered body.

20. The manufacturing method according to claim 17, wherein the preparation of the porous sintered body includes bonding a porous sintered body of valve metal powder into the metal case by using a bonding material containing valve metal powder.

21. The manufacturing method according to claim 17, wherein the preparation of the metal case includes subjecting a metal frame to drawing.

22. The manufacturing method according to claim 17, wherein the metal case includes an opening defined by a plurality of side plate portions, and wherein the formation of the dielectric layer and the solid electrolyte layer is performed by setting the metal case to be open upward and pouring treatment liquid for forming the dielectric layer or the solid electrolyte layer into the metal case through the opening.

23. A method for manufacturing a solid electrolytic capacitor including a metal case and a porous sintered body accommodated in the metal case, the method comprising:
preparing the metal case;
preparing the porous sintered body; and
farming a dielectric layer and a solid electrolyte layer at the porous sintered body;
wherein the porous sintered body includes a bonding surface bonded to the metal case and a non-bonding surface which is not bonded to the metal case;
wherein the step of forming the dielectric layer and the solid electrolyte layer comprises forming the dielectric layer and the solid electrolyte layer at an interior and the non-bonding surface of the porous sintered body;
wherein a metal member at the non-bonding surface of the porous sintered body after the formation of the dielectric layer and the solid electrolyte layer so that the metal member is electrically connected to the solid electrolyte layer; and
wherein part of the metal member is extended out of the metal case to act as a cathode terminal.

24. The manufacturing method according to claim 23, further comprising the step of loading resin into the metal case to seal part of the metal member with the resin after the metal member is provided at the non-bonding surface.

25. The manufacturing method according to claim 23, further comprising the step of covering an outer surface of the metal case with resin.

* * * * *